(12) United States Patent
Berry

(10) Patent No.: US 6,505,707 B1
(45) Date of Patent: *Jan. 14, 2003

(54) COMBINATION TREE STAND, BLIND AND EQUIPMENT CARRIER

(75) Inventor: David Lee Berry, Marysville, WA (US)

(73) Assignee: Hurrican Graphics, Inc., Arlington, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 62 days.

(21) Appl. No.: 09/390,421

(22) Filed: Sep. 3, 1999

Related U.S. Application Data

(60) Provisional application No. 60/099,110, filed on Sep. 3, 1998.

(51) Int. Cl.$^7$ .................................................. A01M 31/00
(52) U.S. Cl. ........................ 182/20; 182/116; 182/195
(58) Field of Search ........................... 182/116, 20, 187, 182/188, 115, 195, 209–213; 135/901; 43/1

(56) References Cited

U.S. PATENT DOCUMENTS

| | | | | |
|---|---|---|---|---|
| 2,942,609 A | * | 6/1960 | Ferguson | 182/115 |
| 3,291,258 A | * | 12/1966 | Twilley | 182/211 |
| 3,336,999 A | * | 8/1967 | McSwain | 182/20 |
| 3,358,789 A | * | 12/1967 | Caun | 182/187 |
| 4,951,696 A | * | 8/1990 | Jones | 43/1 |
| 5,133,378 A | * | 7/1992 | Tanasychuk | 135/901 |
| 5,566,780 A | * | 10/1996 | Bambrough | 182/116 |
| 5,622,198 A | * | 4/1997 | Elsinger | 135/901 |
| 5,927,435 A | * | 7/1999 | Benton | 182/116 |

FOREIGN PATENT DOCUMENTS

| | | | | |
|---|---|---|---|---|
| DE | 1202961 | * | 10/1965 | 182/115 |
| GB | 13428 | * | 11/1885 | 182/209 |
| WO | 15651 | * | 10/1991 | 182/195 |

* cited by examiner

*Primary Examiner*—Alvin Chin-Shue
(74) *Attorney, Agent, or Firm*—SEED Intellectual Property Law Group PLLC

(57) ABSTRACT

A combination tree stand, blind and equipment carrier having a platform to support a user thereon within a user enclosure, a top frame member defining an upward opening of the enclosure, and first and second hinge assemblies connecting the top frame to the platform to allow it to be moved between a collapsed position and a fully erect position. The first and second hinge assemblies are positioned to extend between rearward and forward portions of the platform and the top frame. The hinge assemblies fold inward toward each other to collapse the enclosure for carrying or use as an equipment carrier when wheels are added. A seat is pivotally connected to the first hinge assembly which also serves as a back for the seat. A shelf and a splash panel are pivotally connected to the second hinge assembly. The platform has an access opening for the user to enter the user enclosure, and an access door. A telescoping ladder is pivotally attachable to the platform at a position below the platform and adjacent to the access opening. Adjacent pairs of ladder sections have side rails of one positioned inward of the side rails of the other and slidably retained together. Lock members lock adjacent pairs of ladder sections together when in the fully extended position upon actuation of lock actuators. A lock clip uses lock actuator screws in one embodiment, and another a cam and lever arrangement to move the lock members of adjacent rails into the locked position.

30 Claims, 20 Drawing Sheets

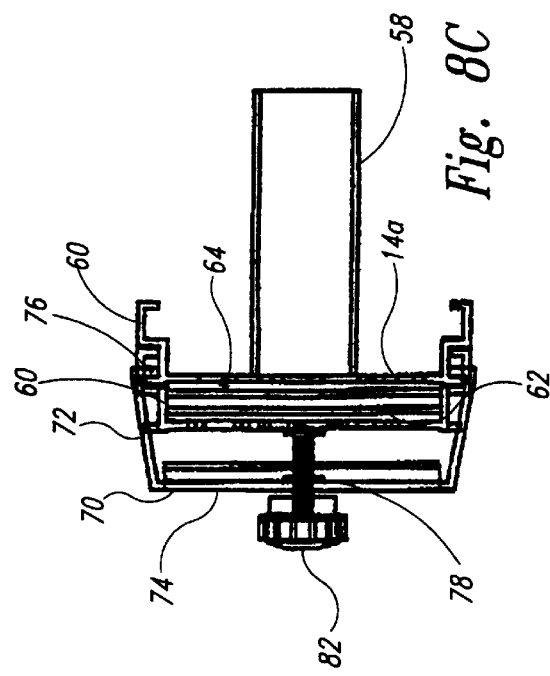
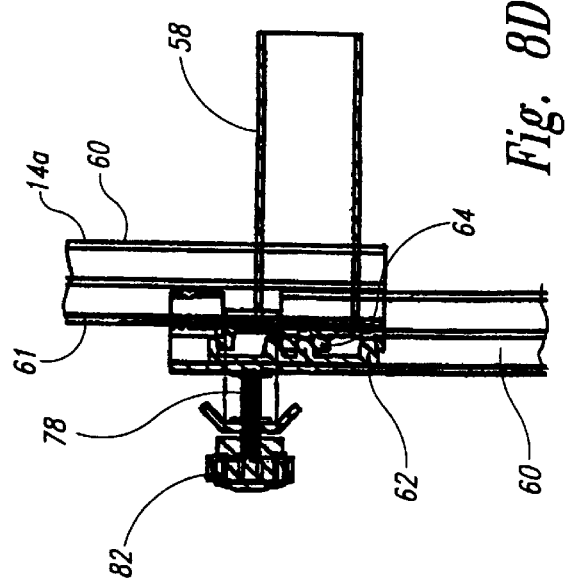
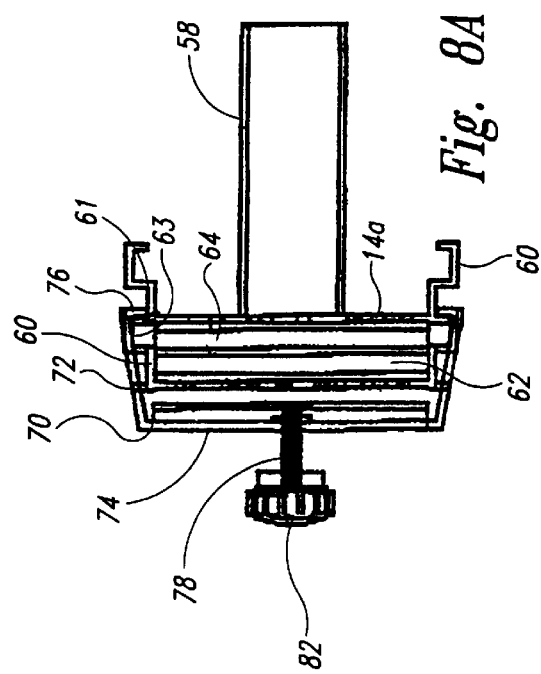
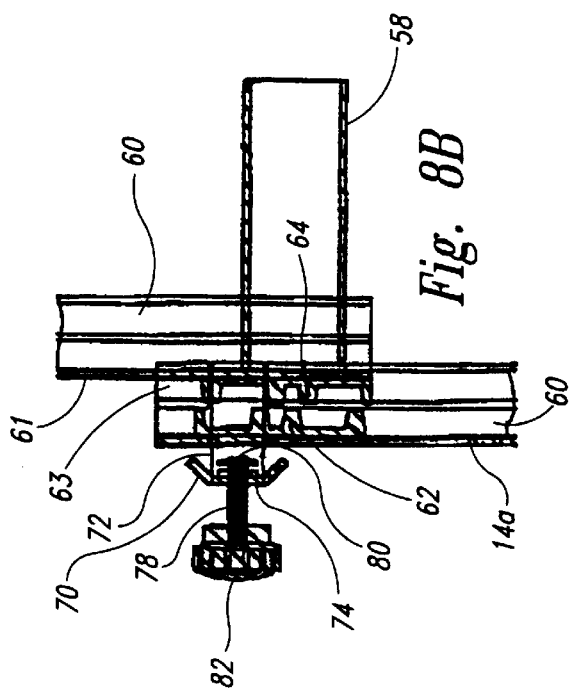

COMBINATION TREE STAND, BLIND AND EQUIPMENT CARRIER

CROSS-REFERENCE TO RELATED APPLICATION

This application claims priority from U.S. Provisional Patent Application Serial No. 60/099,110, filed Sep. 3, 1998, which application is hereby incorporated by reference in its entirety.

TECHNICAL FIELD

The present invention relates generally to tree stands, blinds and equipment carriers for use in hunting, and more particularly, to a combination tree stand, blind and equipment carrier which provides a multi-purpose product having a lightweight, compact and sturdy design.

BACKGROUND OF THE INVENTION

Many tree stand products exist to aid the hunter. Further, many blind designs exist for the same purpose. Also, numerous equipment carrier designs exist which can be used by the hunter. Nevertheless, there is a need for a combination tree stand, blind and equipment carrier which is lightweight and has a compact and sturdy design. The present invention fulfills these needs and further provides other related advantages.

SUMMARY OF THE INVENTION

The present invention resides in a portable and collapsible user enclosure having a platform configured to support a user thereon within the user enclosure, a top frame member defining an upward opening of the user enclosure, and first and second hinge assemblies connecting the top frame to the platform to allow it to be moved between a collapsed position and a fully erect position. The first hinge assembly has an upper first hinge member with an upper end portion pivotally connected to the top frame member and a lower end portion, and a lower first hinge member with a lower end portion pivotally connected to the platform and an upper end portion pivotally connected to the lower end portion of the upper first hinge member. The second binge assembly has an upper second hinge member with an upper end portion pivotally connected to the top frame member and a lower end portion, and a lower second hinge member with a lower end portion pivotally connected to the platform and an upper end portion pivotally connected to the lower end portion of the upper second hinge member. The first and second hinge assemblies being foldable to move one of the top frame member and the platform toward the other to collapse the user enclosure.

The first and second hinge assemblies are spaced apart in positions opposite each other, and the first and second hinge assemblies fold inward toward each other. In the illustrated embodiment of the user enclosure, the platform and the top frame each have forward and rearward portions, and the first hinge assembly is positioned to extend between the rearward portions of the platform and the top frame, and the second hinge assembly is positioned to extend between the forward portions of the platform and the top frame.

The illustrated embodiment of the user enclosure further includes a seat for the user. The first hinge assembly supports the seat in a position within the user enclosure. The seat is pivotally connected to the first hinge assembly and is foldable toward the first hinge assembly. The user enclosure further includes a back rest for the user. The upper first hinge member supports the back rest in a position within the user enclosure above the seat.

The illustrated embodiment of the user enclosure further includes a shelf for the user. The second hinge assembly supports the shelf in a position within the user enclosure. The shelf is pivotally connected to the second hinge assembly and is foldable toward the second hinge assembly. The lower second hinge member supports a foot rest in a position within the user enclosure below the shelf. The user enclosure further including a splash panel. The upper second hinge member supports the splash panel in a position within the user enclosure above the shelf.

The user enclosure further includes a canopy pivotally connected to the top frame member and foldable into an open position extending at least partially over the platform and above the seat.

The platform includes an access opening for the user to enter the user enclosure, and the user enclosure further includes an access door movable into an open position which leaves the access opening in an open condition and into a closed position which closes the access opening. The access door is supported by the platform when in the closed position to support the user thereon within the user enclosure. In the illustrated user enclosure the access door is pivotally connected to the platform and pivotable into the open position and into the closed position.

The user enclosure further includes a telescoping ladder pivotally attachable to the platform at a position below the platform and adjacent to the access opening. The ladder is pivotable into a first position extending forwardly adjacent to the platform and into a second position extending downwardly from the platform to permit the user to move between the platform and the ladder through the access opening when the access door is in the open position. The ladder has a longitudinal axis and includes a plurality of ladder sections telescopically connected together and movable along the ladder axis between a fully extended position and a fully collapsed position. Each of the ladder section includes first and second side rails and a rung extending therebetween.

The adjacent pairs of ladder sections have one of the pair of ladder sections with the first and second side rails thereof positioned inward of the first and second side rails of the other of the pair of ladder sections. The rung of the one of the pair of ladder sections is longer than the rung of the other of the pair ladder sections. The first and second side rails of the one of the pair of ladder sections are slidably retained by the respective first and second side rails of the other of the pair of ladder sections for sliding movement along the ladder axis.

The first and second side rails of the one of the pair of ladder sections have first lock members and the first and second side rails of the other of the pair of ladder sections have second lock members. The first and second lock members are positioned on the first and second side rails of the pair of ladder sections to be in position for the respective first and second lock members to lockably engage each other when the ladder is in the fully extended position.

The illustrated embodiment of the user enclosure further includes first and second lock actuators for the adjacent pairs of ladder sections. The first lock actuator is positioned to move the first and second lock members of the first side rails of the pair of ladder sections into locking engagement, and the second lock actuator is positioned to move the first and second lock members of the second side rails of the pair of ladder sections into locking engagement. The first and second lock members each have engagement projections, with the engagement projections of the first and second lock members of the first side rails of the pair of ladder sections projecting toward the other and with the engagement projections of the first and second lock members of the second side rails of the pair of ladder sections projecting toward the other.

The first and second lock actuators each include a manually movable actuator member. The actuator member of the first lock actuator is manually operable to move the first and second lock members of the first side rails of the pair of ladder sections into locking engagement, and the actuator member of the second lock actuator is manually operable to move the first and second lock members of the second side rails of the pair of ladder sections into locking engagement. In one embodiment the actuator members of the first and second lock actuators include threaded screws. In another embodiment the actuator members of the first and second lock actuators include cams.

In the cam embodiment, the cam of the actuator member of the first lock actuator is positioned to engage and operable to move the first side rail of the one of the pair of ladder sections toward the first side rail of the other of the pair of ladder sections to move the first and second lock members of the first side rails of the pair of ladder sections into locking engagement. Likewise, the cam of the actuator member of the second lock actuator is positioned to engage and operable to move the second side rail of the one of the pair of ladder sections toward the second side rail of the other of the pair of ladder sections to move the first and second lock members of the second side rails of the pair of ladder sections into locking engagement.

The actuator member of the first lock actuator further includes a manually rotatable lever coupled to the cam of the first lock actuator and rotatable between an unlocked position and a locked position. Movement of the lever of the first lock actuator to the locked position moves the cam of the first lock actuator to move the first side rail of the one of the pair of ladder sections toward the first side rail of the other of the pair of ladder sections and thereby moves the first and second lock members of the first side rails of the pair of ladder sections into locking engagement. Likewise, the actuator of the second lock actuator further includes a manually rotatable lever coupled to the cam of the second lock actuator and rotatable between an unlocked position and a locked position. Movement of the lever of the second lock actuator to the locked position moves the cam of the second lock actuator to move the second side rail of the one of the pair of ladder sections toward the second side rail of the other of the pair of ladder sections and thereby moves the first and second lock members of the second side rails of the pair of ladder sections into locking engagement.

In the illustrated embodiments of the user enclosures, first and second lock actuators each further include a clip. The clip of the first lock actuator supports the actuator member of the first lock actuator, and has a pair of arms engaging one of the first side rails of the one of the pair of ladder sections and positioning the actuator member of the first lock actuator to engage the first side rail of the other of the pair of ladder sections and thereby move the first and second lock members of the first side rails of the pair of ladder sections into locking engagement. The clip of the second lock actuator supports the actuator member of the second lock actuator, and has a pair of arms engaging one of the second side rails of the one of the pair of ladder sections and positioning the actuator member of the second lock actuator to engage the second side rail of the other of the pair of ladder sections and thereby move the first and second lock members of the second side rails of the pair of ladder sections into locking engagement.

In the cam embodiment, the clip of the first lock actuator rotatably supports the lever of the first lock actuator, and has a pair of arms engaging one of the first side rails of the one of the pair of ladder sections and positioning the cam of the first lock actuator to engage the first side rail of the other of the pair of ladder sections and thereby move the first and second lock members of the first side rails of the pair of ladder sections into locking engagement. The clip of the second lock actuator rotatably supports the lever of the second lock actuator, and has a pair of arms engaging one of the second side rails of the one of the pair of ladder sections and positioning the cam of the second lock actuator to engage the second side rail of the other of the pair of ladder sections and thereby move the first and second lock members of the second side rails of the pair of ladder sections into locking engagement.

Other features and advantages of the invention will become apparent from the following detailed description, taken in conjunction with the accompanying drawings.

BRIEF DESCRIPTION OF THE DRAWINGS

FIG. 8a is an end-sectional view of two side rails of two adjacent ladder sections shown unlocked.

FIG. 8b is a front-sectional view of the side rails of FIG. 8a shown unlocked.

FIG. 8c is an end sectional view of the side rails of FIG. 8a shown locked together.

FIG. 8d is a front-sectional view of the side rails of FIG. 8a shown locked together.

DETAILED DESCRIPTION OF THE INVENTION

Figure 5:
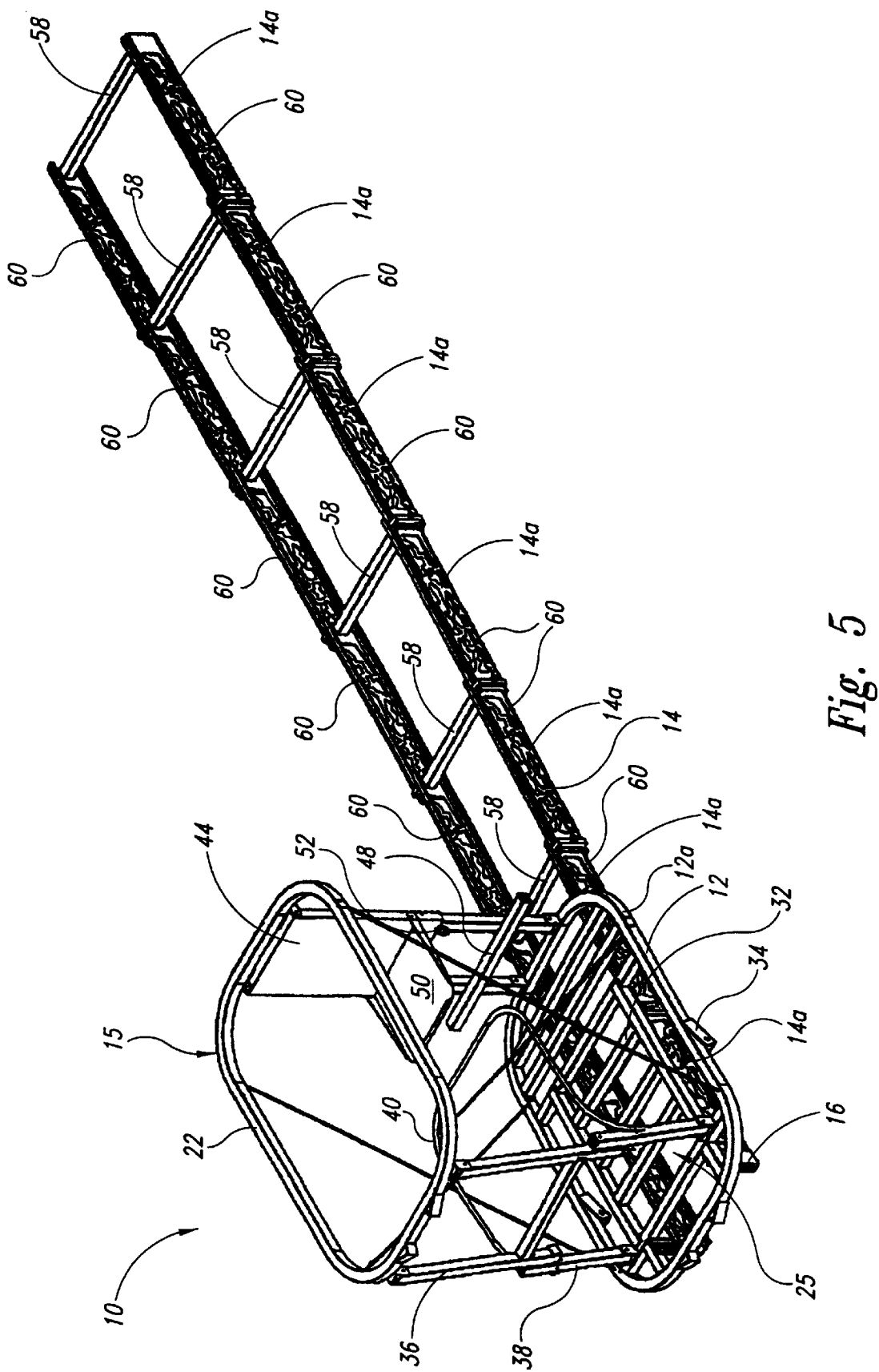
FIG. 5 is a perspective view of the apparatus of FIG. 1 with the user enclosure in a fully expanded position with the ladder attached and in a fully extended position.
Figure 6:
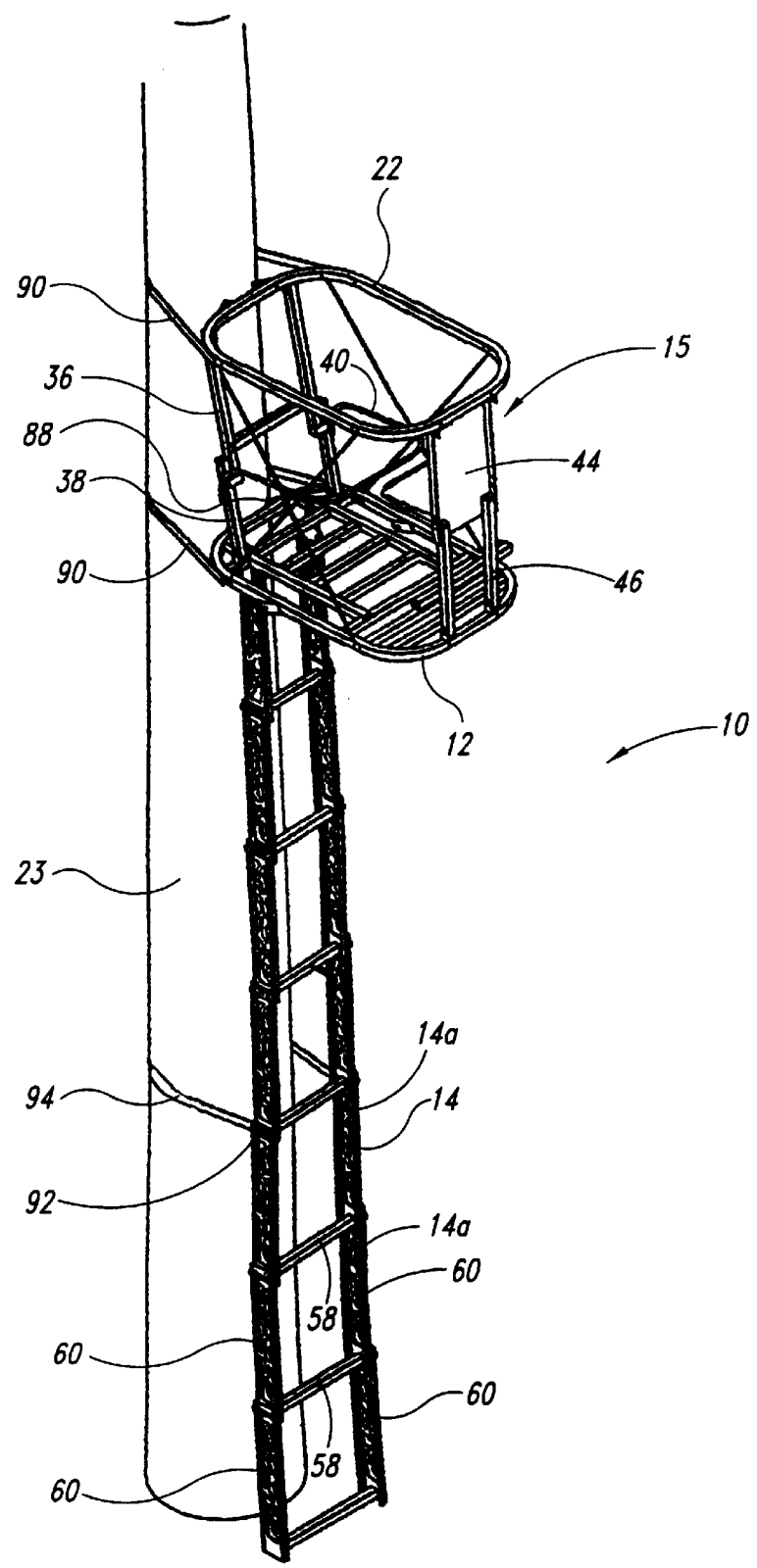
FIG. 6 is a perspective view of the apparatus as shown in FIG. 5 shown positioned against a tree trunk for use as a tree stand.
Figure 7:
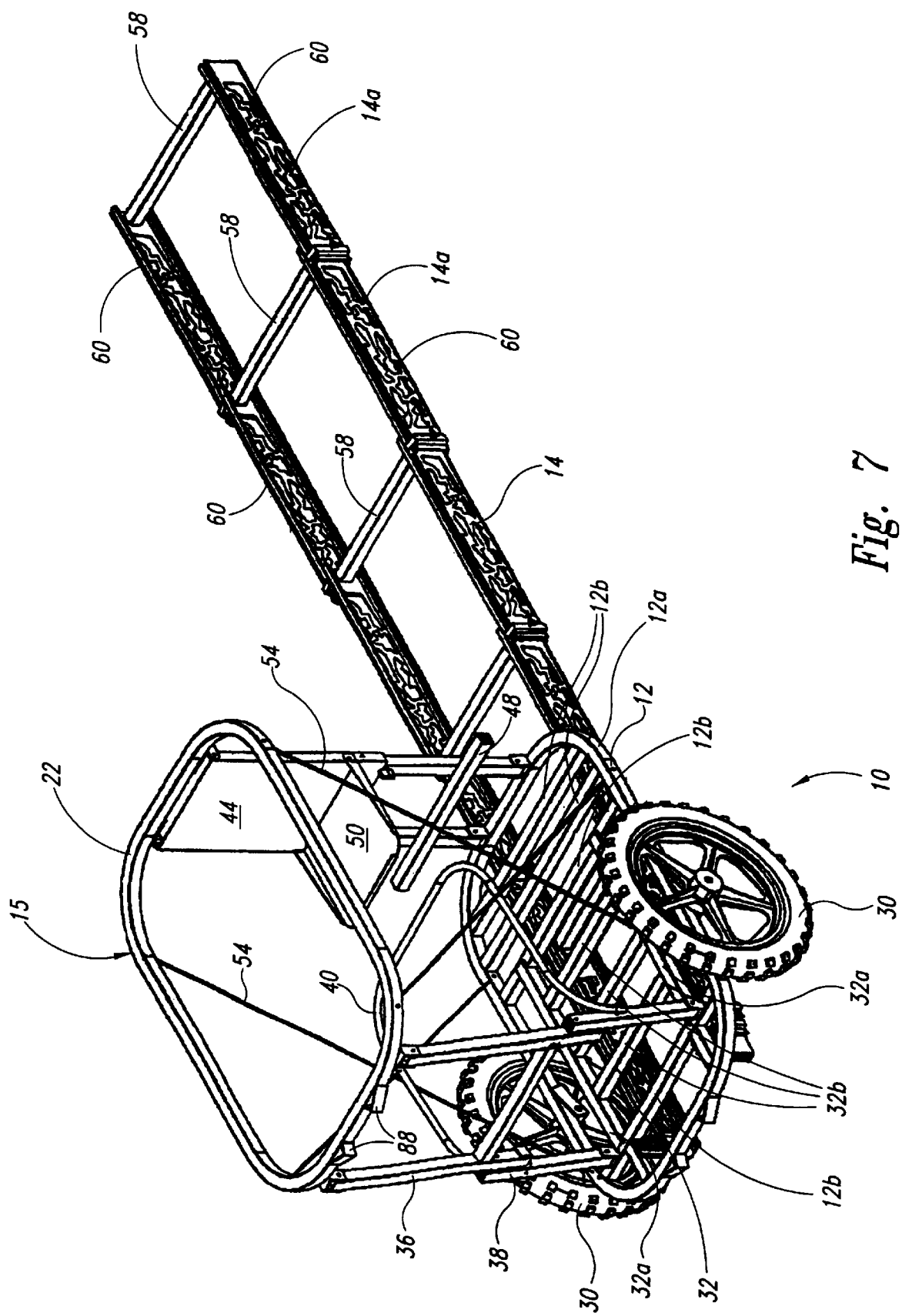
FIG. 7 is a perspective view of the apparatus as shown in FIG. 5 shown with the ladder partially extended with a pair of mounted wheels for use as an equipment carrier.

As shown in the drawings for purposes of illustration, the present invention is embodied in a hunting apparatus, indicating generally by reference 10. The apparatus 10 serves as a combination tree stand, blind and equipment carrier, as will be described in greater detail below. The apparatus 10 includes a platform 12 upon which a hunter or other user stands when using the apparatus as a tree stand or a field blind, and upon which equipment is carried when using the apparatus as an equipment carrier. As illustrated in FIGS. 5–7, a telescoping ladder 14 has an upper end 16 removably attached using a pivoted attachment to an underside of a rearward end of the platform 12. The ladder 14 is shown fully extended in FIGS. 5 and 6. The ladder 14, when fully extended, is approximately 14 feet in length and when the apparatus 10 is used as a tree stand, the platform 12 is positioned at about 14 feet above the ground to provide an improved view of the surrounding territory.

Figure 4:
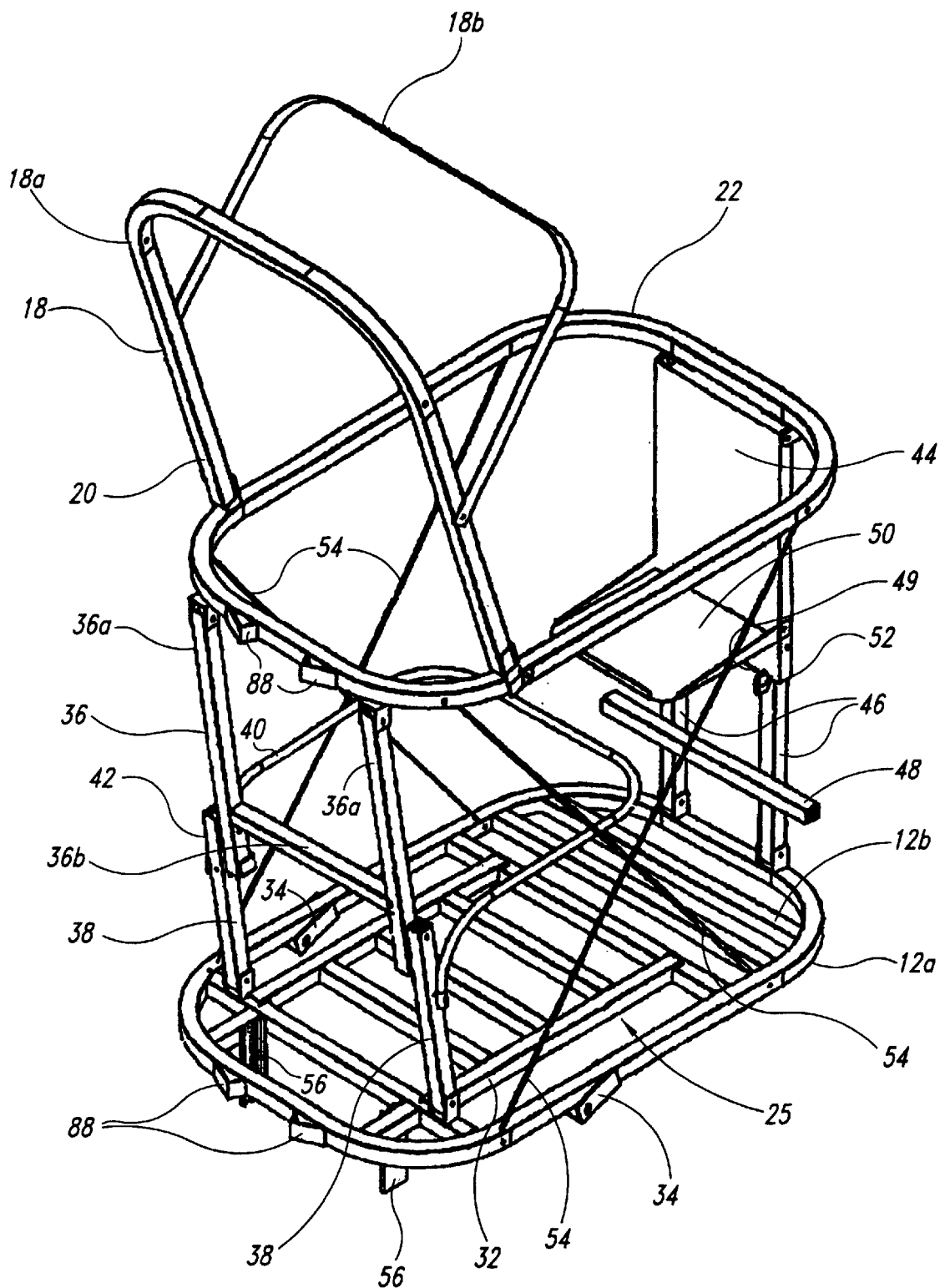
FIG. 4 is a perspective view of the apparatus as shown in FIG. 3 with a canopy frame attached to the user enclosure.
Figure 16:
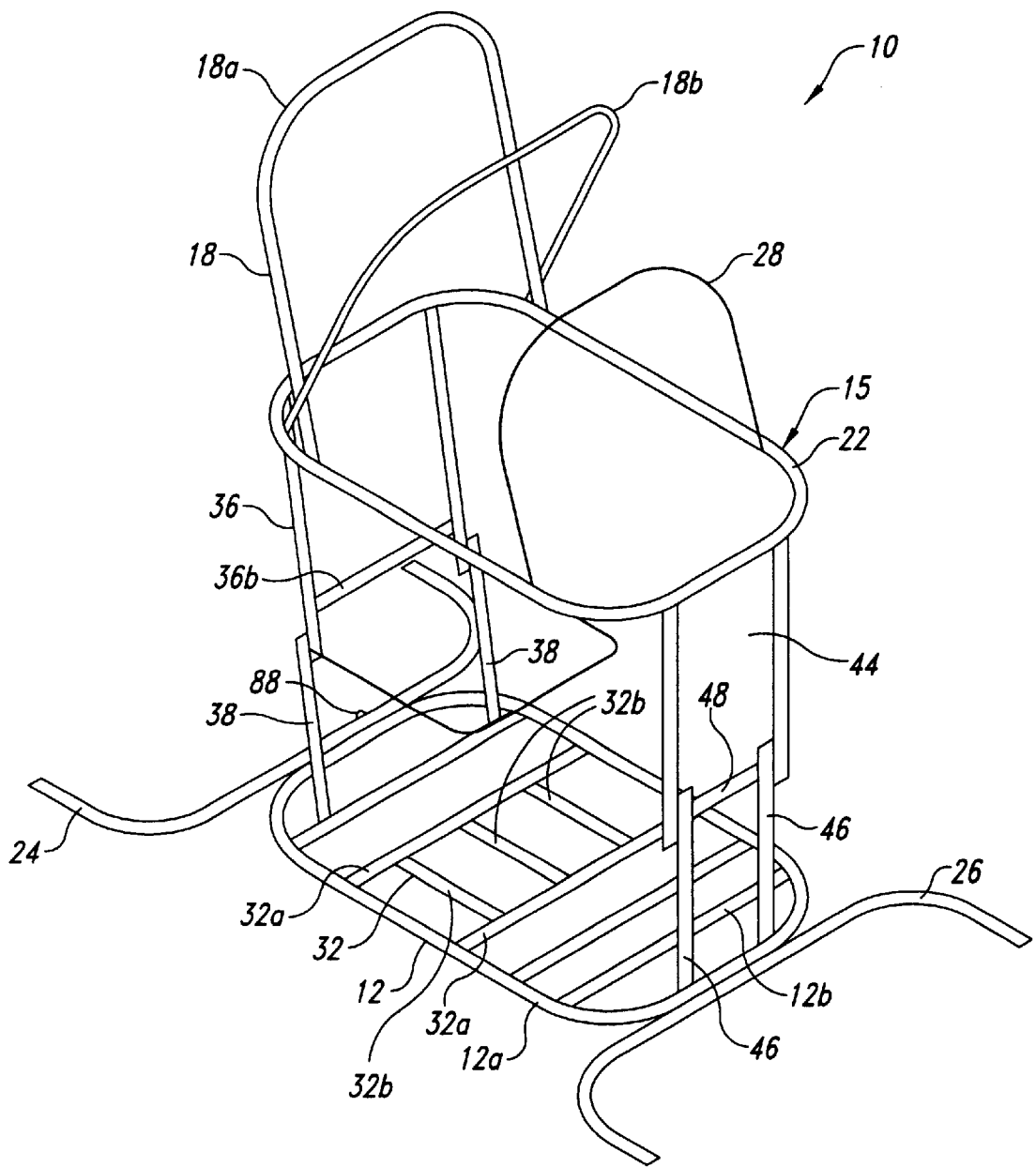
FIG. 16 is a perspective view of the alternative embodiment of the apparatus of FIG. 11 with the user enclosure in a fully expanded position and with a canopy frame and face shield frame attached and showing a pair of outriggers in position for use as a field blind.

For use as a tree stand or a field blind, the apparatus includes a balcony or top frame rail 22 which with the platform 12, define a user enclosure 15 within which a user can enter and comfortably remain for a prolonged period. When the apparatus 10 is used as a tree stand or a field blind, a canopy frame 18, as shown in FIG. 4, can be pivotally attached at a lower end 20 to the top frame rail 22. The canopy frame 18 includes a main canopy frame member 18a which has its lower ends pivotally attached to the upper frame rail 22, and a forward canopy frame member 18b which has its ends pivotally attached to the main canopy frame member 18a. The apparatus 10 is converted to a field blind by detaching the ladder 14 from the platform 12. As shown in FIG. 16 for the embodiment of the apparatus shown therein, for use as a field blind a rear outrigger 24 is attached to a rearward end of the platform 12 and a forward outrigger 26 is attached to a forward end of the platform 12 to provide added stability to the platform when sitting on the ground.

Figure 14:
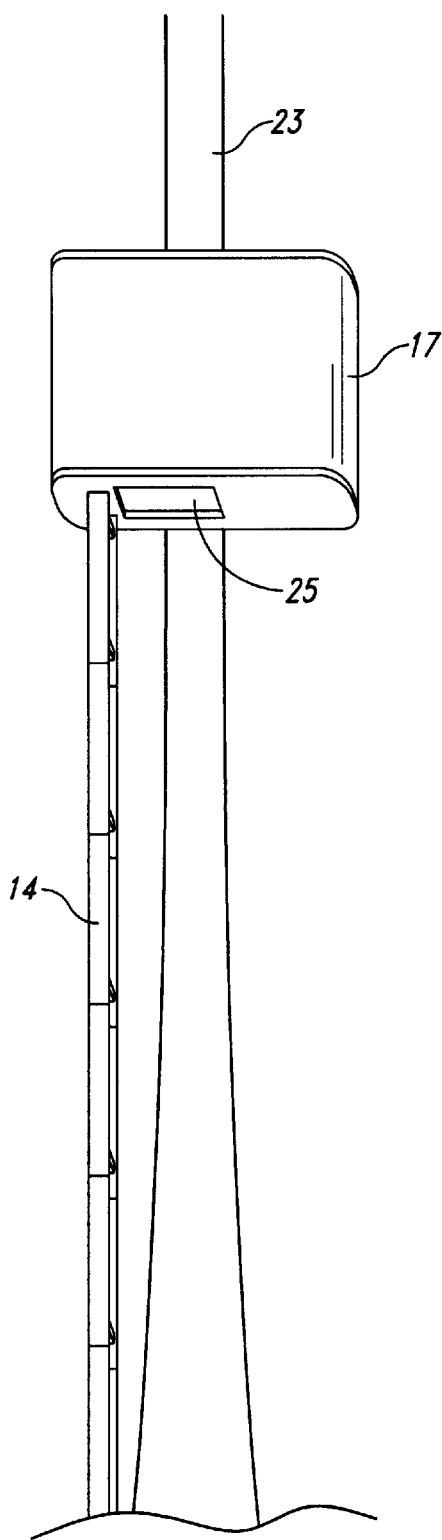
FIG. 14 is a perspective view of the alternative embodiment of the apparatus as shown in FIG. 12 in position for use against a tree showing a user about to climb through the floor access opening and with the fabric covering for the user enclosure in place.
Figure 15:
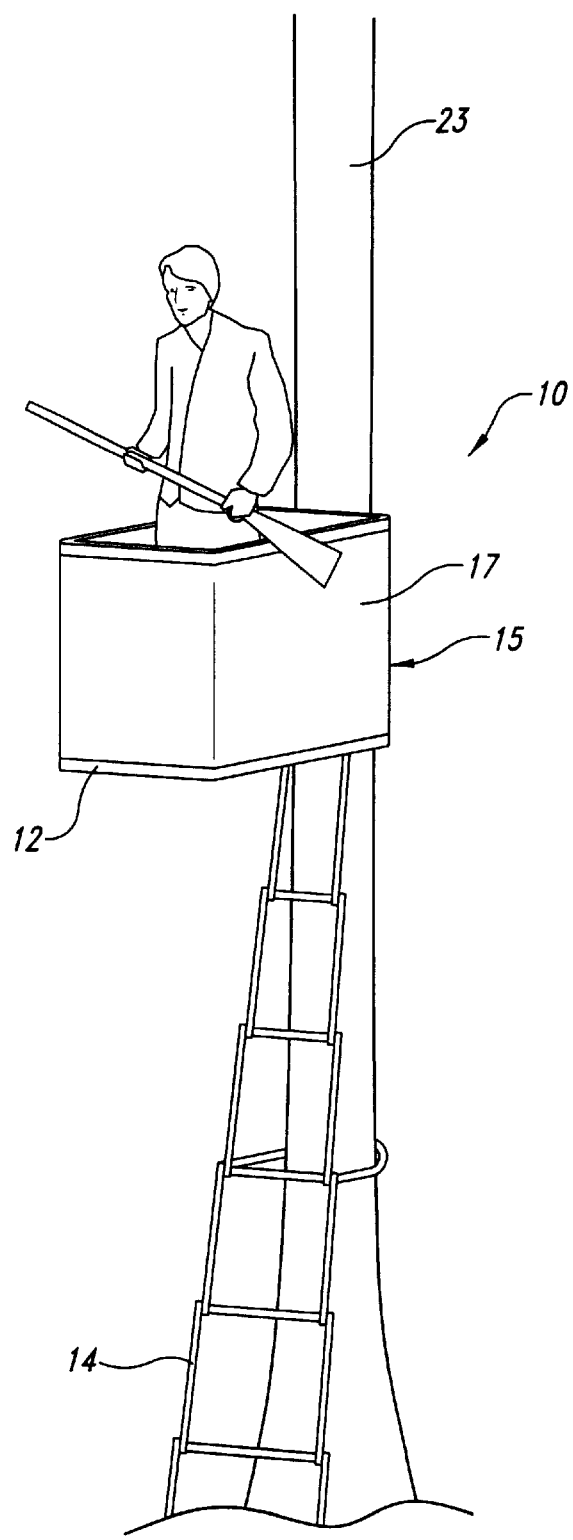
FIG. 15 is a perspective view of the alternative embodiment of the apparatus as shown in FIG. 14 with the user standing in the user enclosure.
Figure 17:
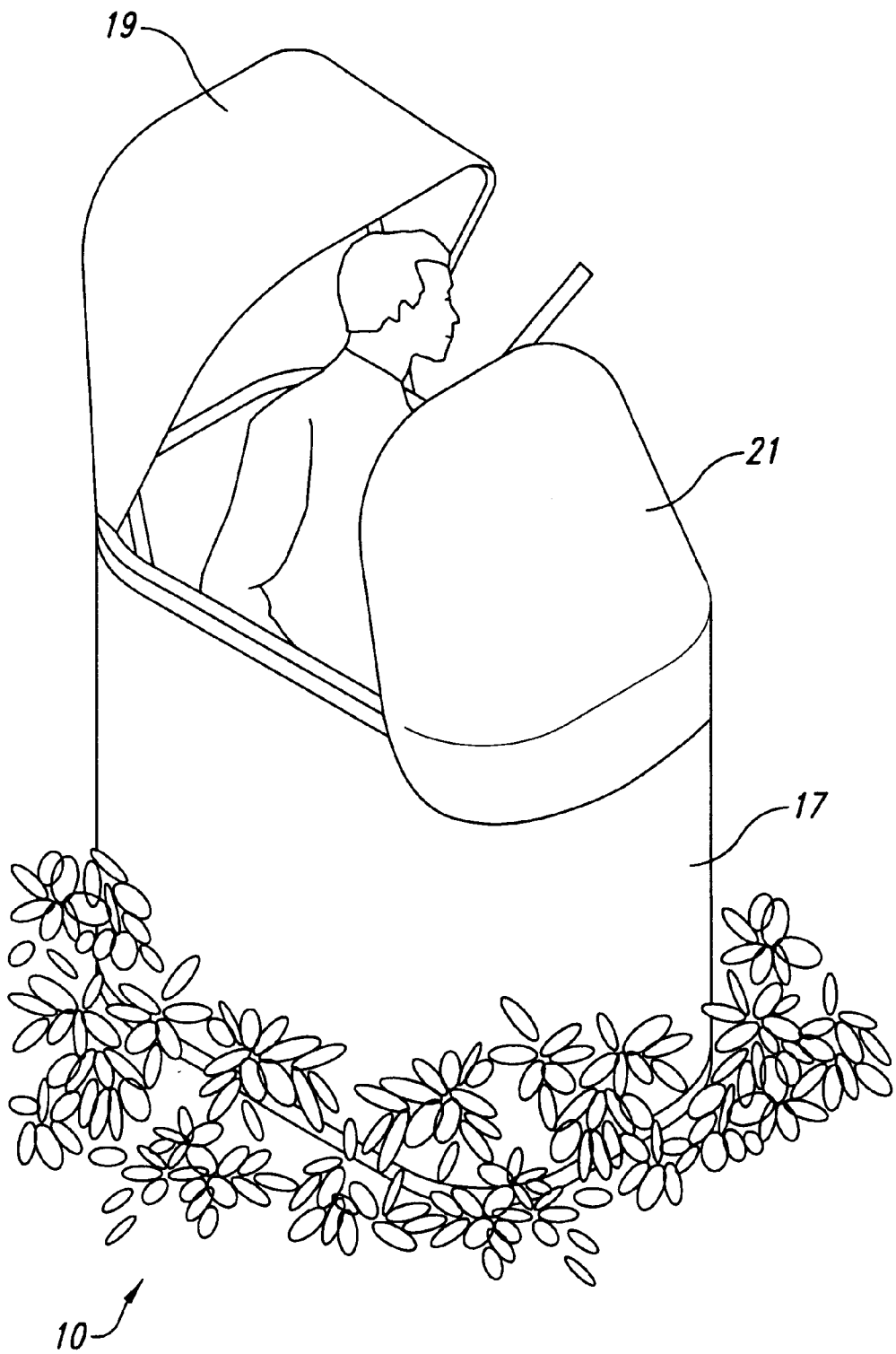
FIG. 17 is a perspective view of the alternative embodiment of the apparatus as shown in FIG. 16 with the user crouching in the user enclosure and with the fabric coverings in place.

A perimeter frame member 12a of the platform 12 and the top frame rail 22 have, on their outward sides, a plurality of snaps attached thereto for mating with corresponding snap fittings on a fabric cover 17, shown installed in FIGS. 14, 15 and 17. The fabric cover 17 is preferably a camouflage material when the apparatus 10 is used as a tree stand or a field blind for hunting. The fabric cover 17 extends about the user enclosure 15, between the platform 12 and the top frame rail 22. Another cover 19 is attached to the canopy frame 18, as best seen in FIG. 17 to form a roof over the rearward half of the user enclosure 15. To provide further camouflage, the apparatus 10 includes a face shield frame 28, shown in FIG. 16, which is pivotally attached to the upper frame rail 22 at a forward end thereof The face shield frame 28 has a cover 21 attached thereto, as shown in FIG. 17. The main canopy frame member 18 can be pivoted rearwardly and the forward canopy frame member 18 can be pivoted rearwardly to fold the canopy out of the way when desired. Similarly, the face shield frame 28 can be pivoted forwardly to move it out of the way when desired.

Figure 18:
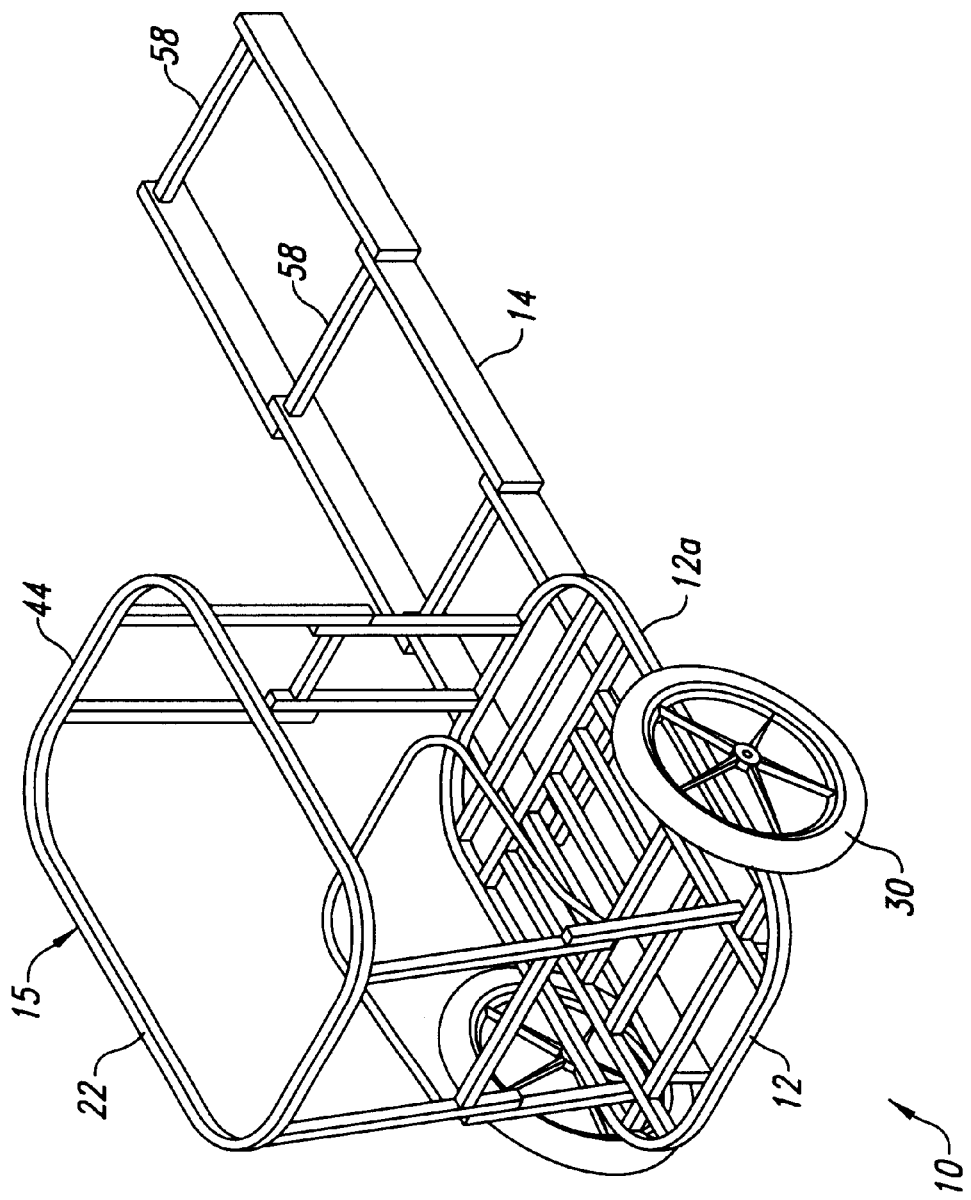
FIG. 18 is a perspective view of the alternative embodiment of the apparatus of FIG. 11 with the user enclosure shown in a fully expanded position and with the ladder partially extended and the wheels mounted for use as an equipment carrier.
Figure 19:
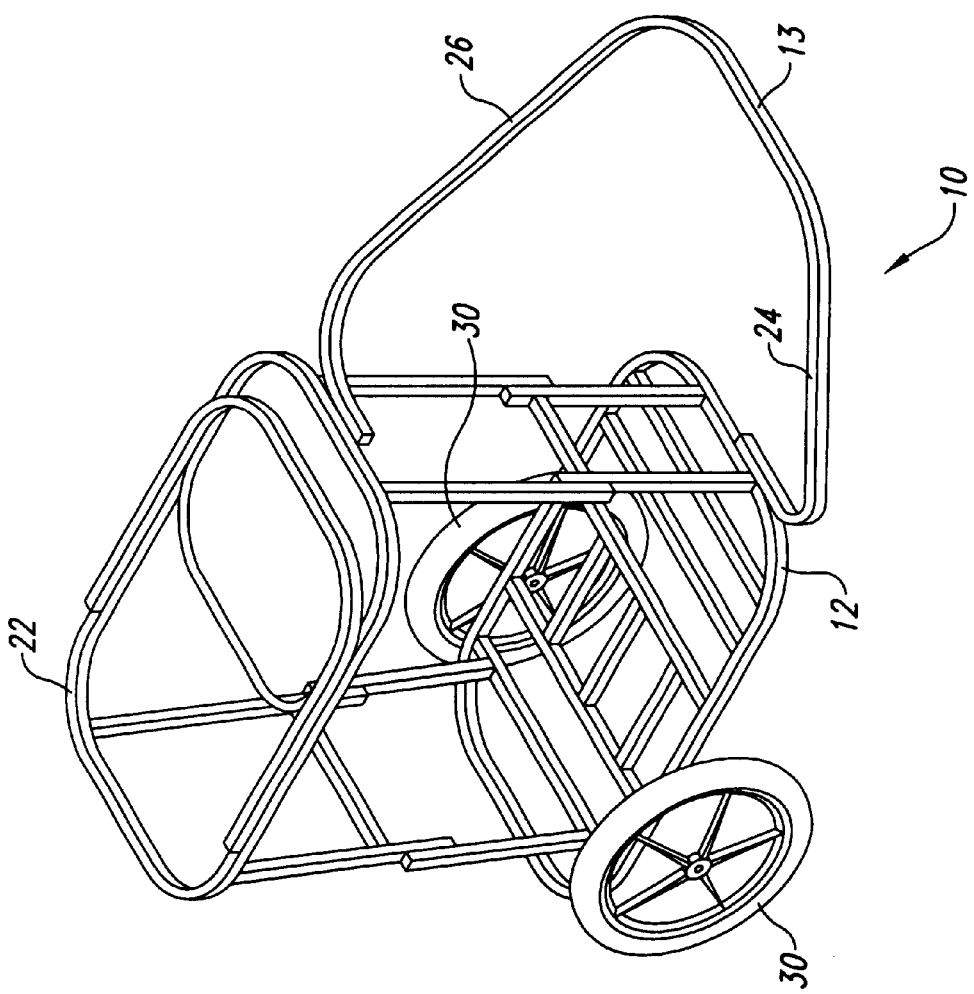
FIG. 19 is a perspective view of the alternative embodiment of the apparatus as shown in FIG. 11 with the ladder removed and with the outriggers assembled to form a handle.
Figure 20:
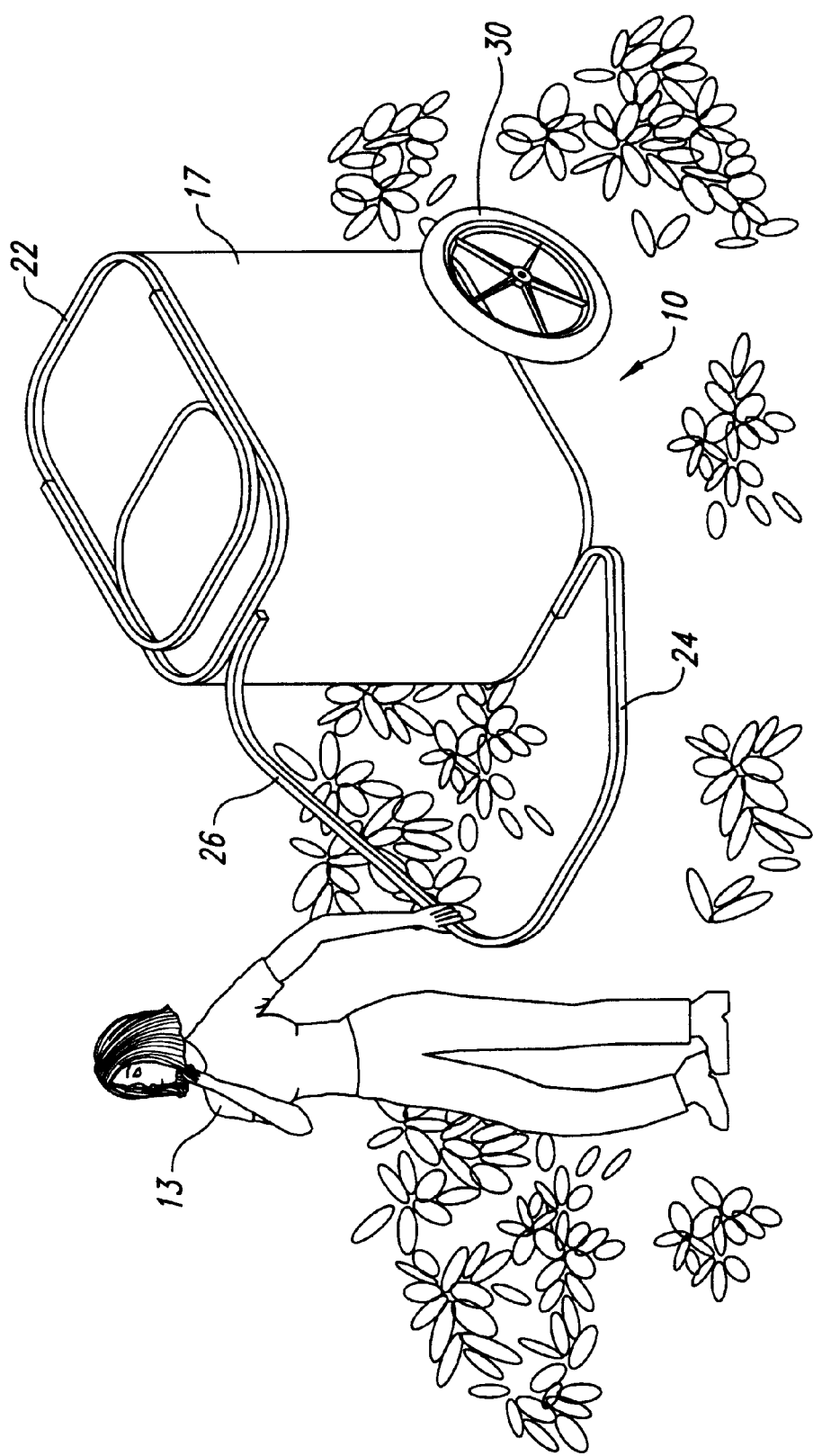
FIG. 20 is a perspective view of the alternative embodiment of the apparatus as shown in FIG. 19 being pulled by a user grasping the handle.

The apparatus 10 may be converted to an equipment carrier to operate as a cart by attachment of left and right wheels 30 to the platform 12. In this configuration, the user enclosure 15 may be collapsed if desired and the apparatus 10 can be used as a cart, either pulled or pushed by hand, or pulled by an ATV, a mountain bicycle or some other powered device. The wheels 30 are of sufficient diameter and size so as to easily transverse over rough terrain. The apparatus 10 is shown in the equipment carrier configuration in FIGS. 7, 18, 19 and 20. In FIGS. 7 and 18, the ladder 14 is shown extended to the degree desired so that it can be grasped for pulling or attached to a pulling device. A lowermost rung 32 of the ladder 14 serves as a convenient cart handle for pulling by a single person. Alternatively, the ladder 14 can be detached from the platform 12 and the forward and rearward outriggers 24 and 26 can have one of their ends attached together and the other ends attached to the apparatus 10, one being attached to the platform 12 and the other to the top frame rail 22 to provide a convenient handle 13 for grasping by a user, as shown in FIG. 20.

Figure 1:
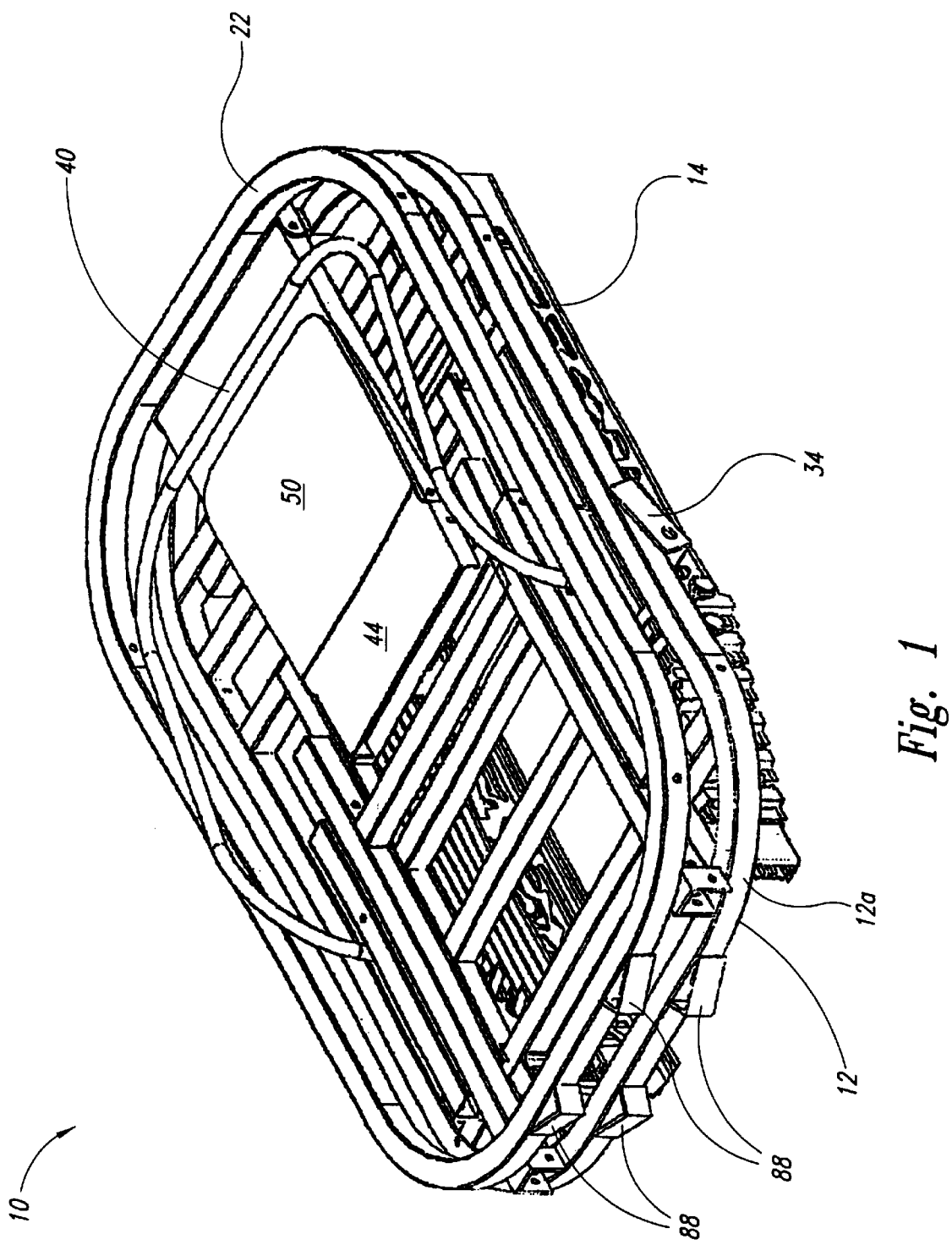
FIG. 1 is a perspective view of a combination tree stand, blind and equipment carrier apparatus embodying the present invention shown in a fully collapsed position without the fabric coverings.
Figure 11:
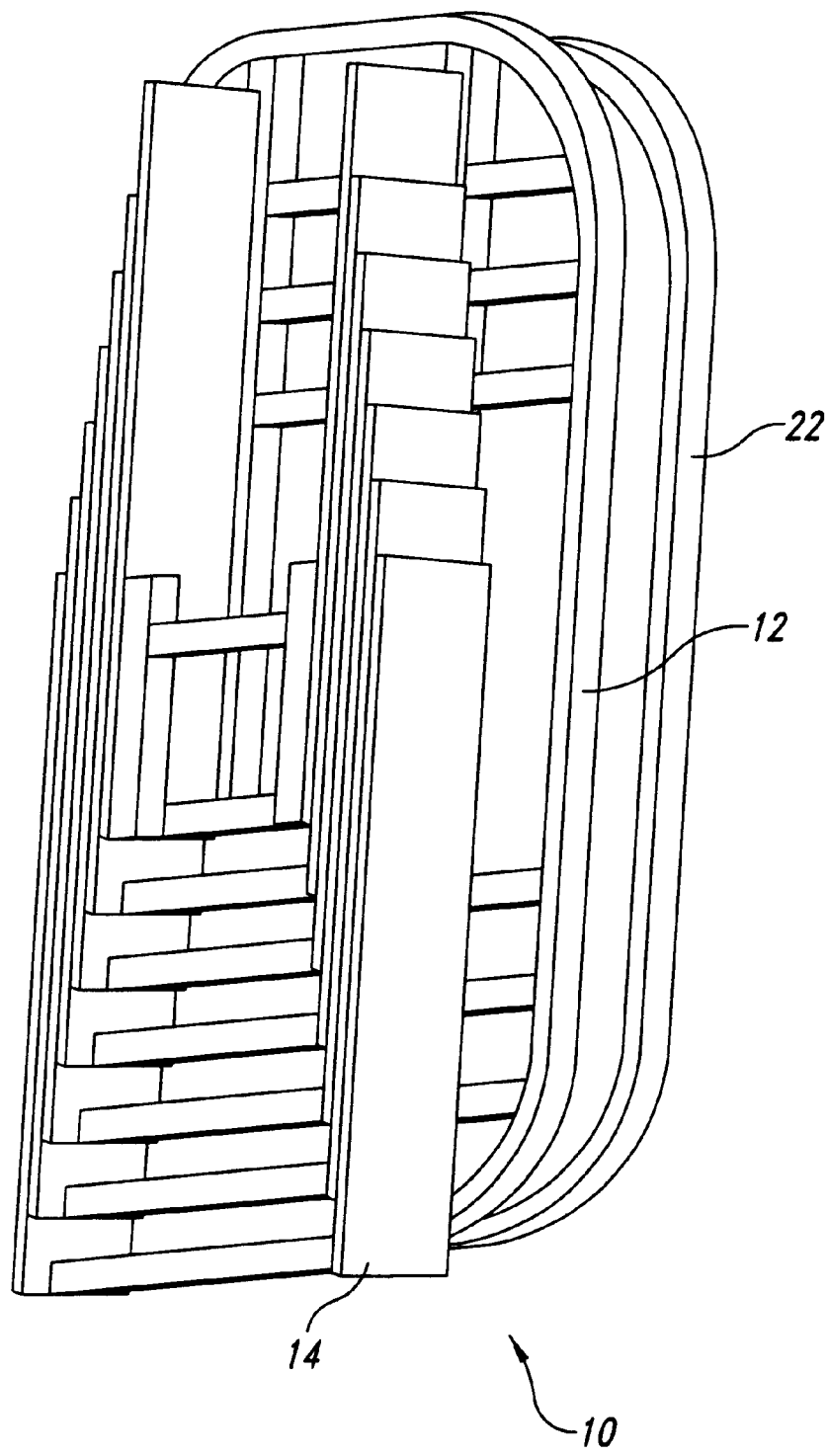
FIG. 11 is a perspective view of an alternative embodiment of the apparatus of FIG. 1 shown in a fully collapsed position without the fabric coverings.

The apparatus 10, with the user enclosure 15 collapsed and with the ladder 14 collapsed but still attached to the platform 12, has a size that is approximately 7 inches by 22 inches by 34 inches (7"×22"×34"), as shown in FIGS. 1 and 11. Shoulder straps and a waist belt (not shown) can be attached to the apparatus 10 to permit it to be carried on the back of the user like a packboard so that it can be conveniently transported over even rough terrain. The apparatus weighs under 40 pounds in this configuration with the wheels 30 removed.

Figure 2:
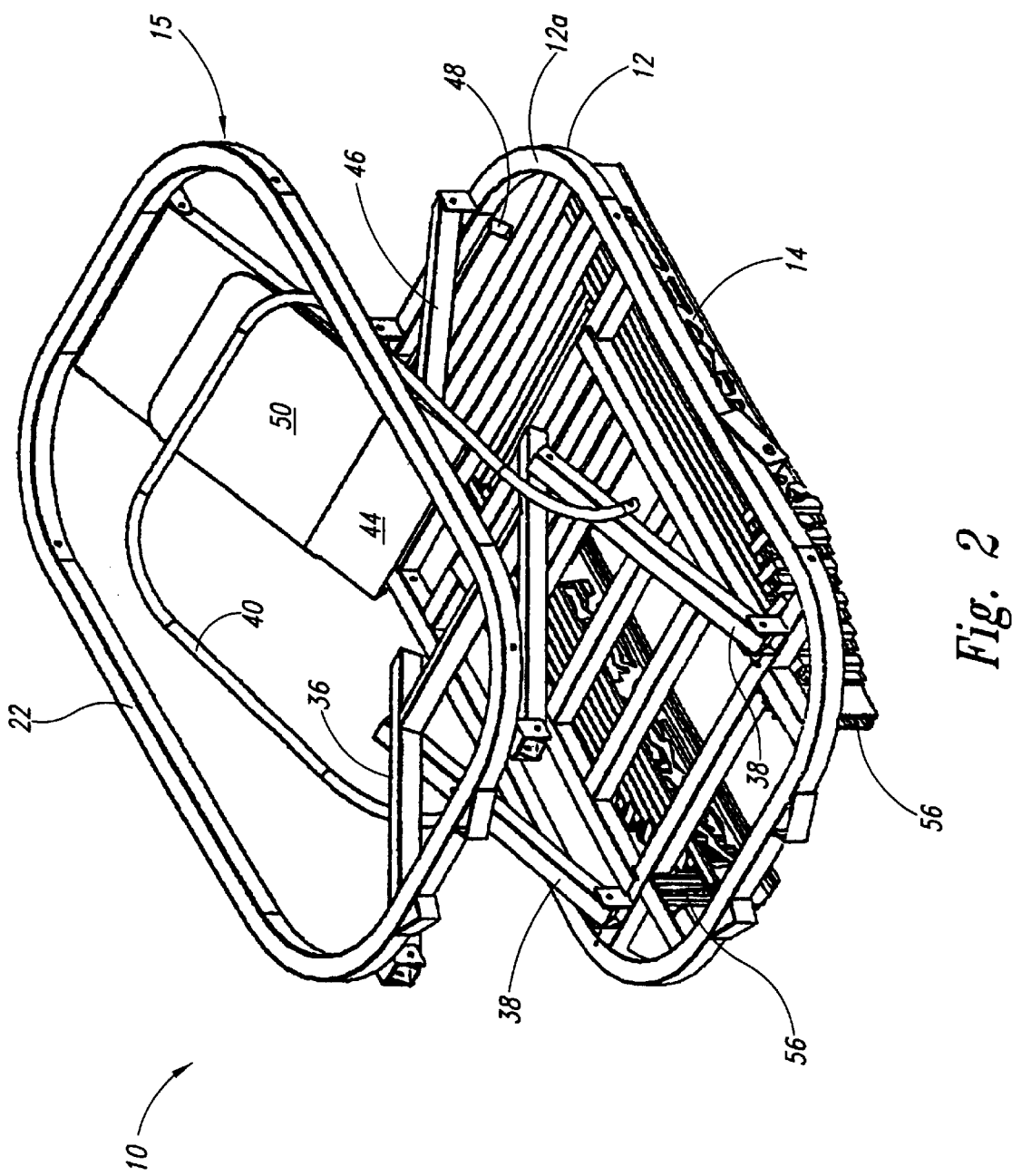
FIG. 2 is a perspective view of the apparatus of FIG. 1 with a user enclosure in a partially expanded position.
Figure 3:
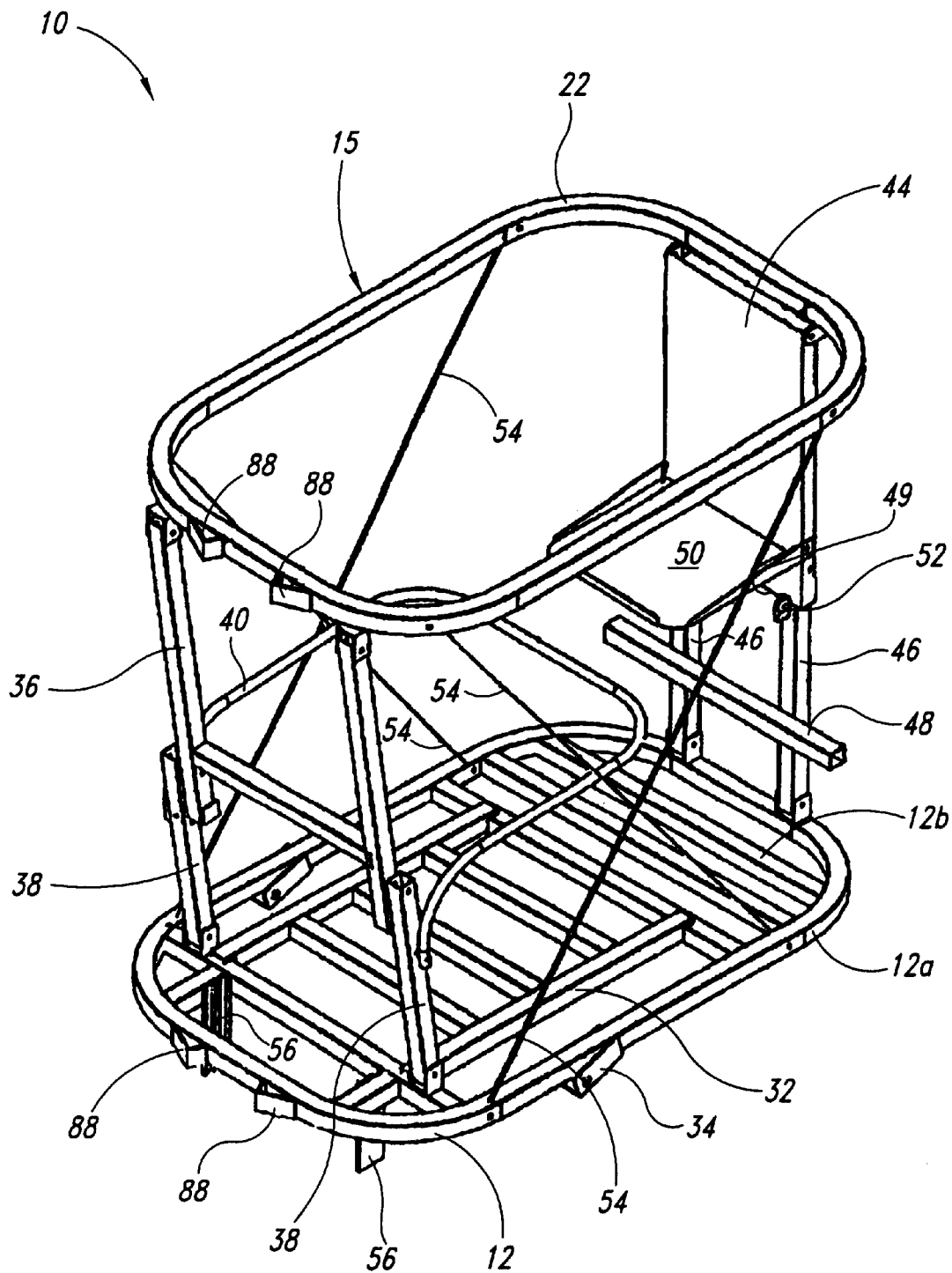
FIG. 3 is a perspective view of the apparatus of FIG. 1 with the user enclosure in a fully expanded position without a ladder attached.

As illustrated in the sequence of FIGS. 1, 2 and 3, the user enclosure 15 has a pop-up design. The perimeter frame member 12a of the platform 12 is in the shape of a rectangle with radius corners approximately 22"×34". Four reinforcing members 12b extend laterally between the left and right side portions of the frame member 12a. Three of the laterally-extending reinforcing members 12b are toward the forward end of the platform 12 and one reinforcing members is toward the rearward end of the platform to define an access opening 25 therebetween of a sufficient size to permit a person climbing up the ladder 14, when the apparatus 10 is in position against a tree 23, such as shown in FIG. 6, to climb from the ladder through the access opening and into the user enclosure 15. When inside, the user can stand on the floor thereof formed by the reinforcing members 12b. The opening is covered by an access door 32 which is hinged to the rearward-most reinforcing member 12b and can be selectively opened for access to or egress from the user enclosure 15 through the access opening 25. When closed, the rearward end of the access door 32 is supported by the rearward-most reinforcing member 12b and the forward end is supported by the rearward-most reinforcing member 12a of the three forward reinforcing members. The access door 32 is approximately 14"×17" in size.

The access door 32 in one embodiment is constructed of a pair of forwardly-extending left and right side members 32a with three transverse members 32b extending therebetween. The reinforcing members 12b of the platform 12 and the members 32a and 32b which make up the access door 32 are made of square tubing extruded from 6063T6 aluminum to produce a 1"×1" square, with radius corners and a wall thickness of ±0.060". The access door 32 is hinged to the rearward-most reinforcing tube 12b of the platform 12 using a commercial grade, outdoor quality, polypropylene carpet. A vinyl tubing (not shown) is pop riveted as a strap at the corners of the access door 32. A carpet (not shown) covers the platform 12 (excluding the access opening 25) and a carpet section covers the access door 32 so that when the access door is in the closed position, a fully-carpeted surface is provided to the user within the user enclosure 15 and on which the user can stand.

Figure 12:
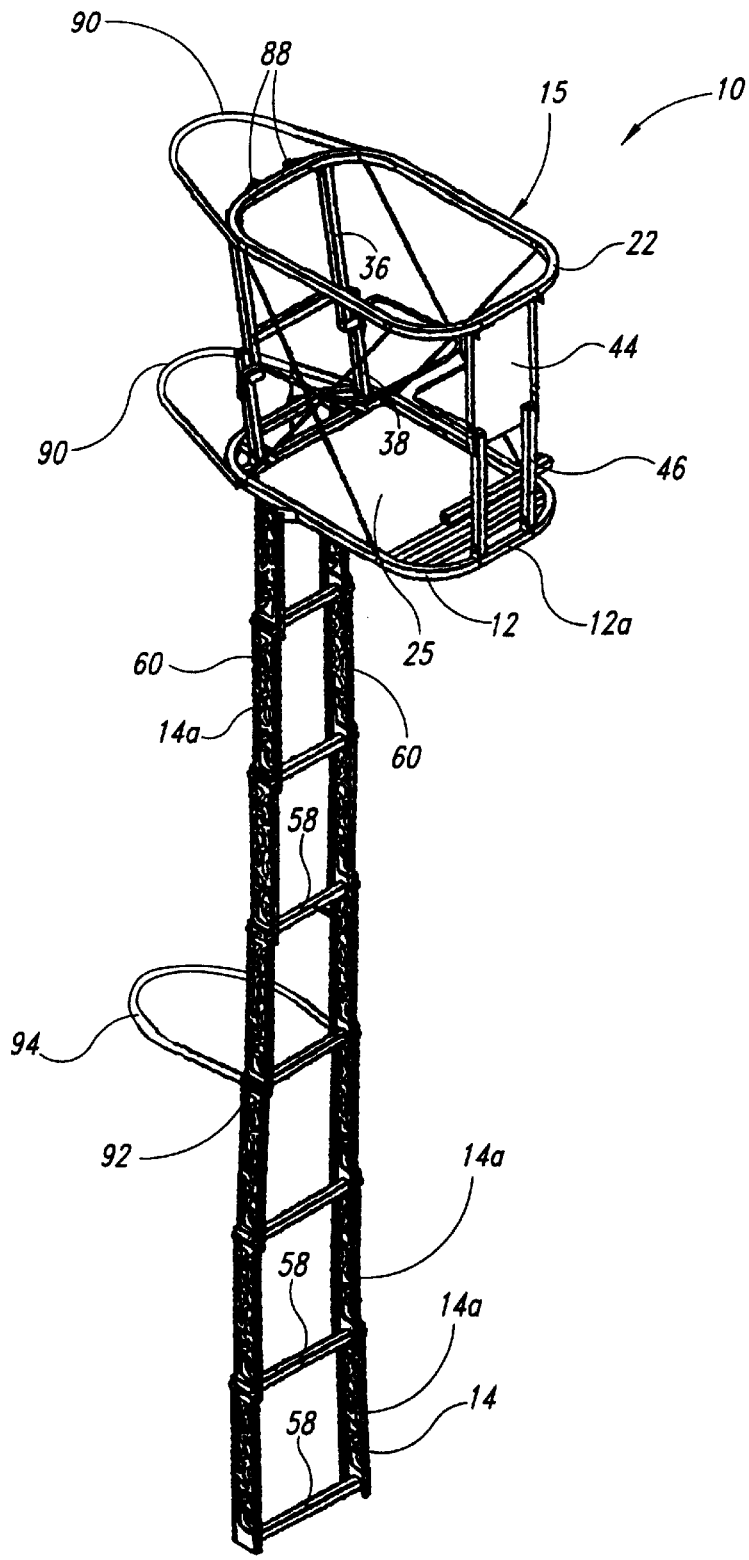
FIG. 12 is a perspective view of the alternative embodiment of the apparatus of FIG. 11 with the user enclosure in a fully expanded position without a floor access door and with the ladder fully extended.
Figure 13:
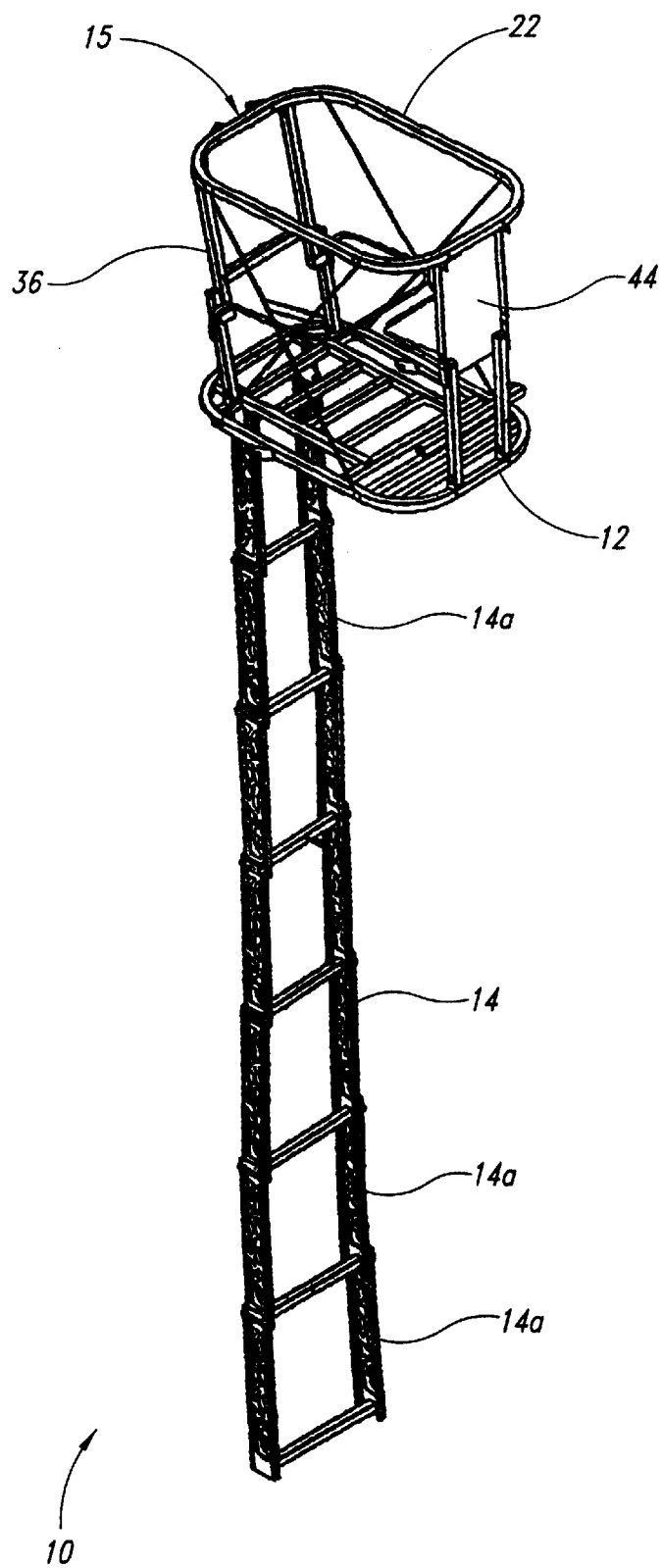
FIG. 13 is a perspective view of the alternative embodiment of the apparatus as shown in FIG. 12 with the floor access door.

In an alternative embodiment shown in FIGS. 12, 13 and 16, the platform 12 includes two forward reinforcing members 12b and one rearward reinforcing member 12b to define the access opening 25 therebetween. The access opening 25 is shown in FIG. 12 without the access door 32 in place. As seen in FIGS. 13 and 16, the access door 32 in this embodiment includes front and rear transverse members 32a which extend between the left and right side portions of the perimeter frame member 12a of the platform 12 and have their ends supported by the perimeter frame member 12a. The access door 32 also includes three forwardly-extending members 32b. In this embodiment, the access door 32 is hinged on the one side using an aluminum box hinge (not shown). The carpet used to cover the platform 12 (excluding the access opening 25) and the access door 32, is a commercial grade polypropylene carpet.

Left and right side axle hubs 34 are welded securely to the left and right side portions, respectively, of the perimeter frame member 12a of the platform 12 and project downwardly to a position below the platform. The axle hubs 34 project rearwardly in the one embodiment. In the embodiment of FIG. 11, the axle hubs 34 project directly downward from the platform 12. Each of the axle hubs 34 receives a corresponding one of the wheels 30 which are 16" SKYWAY Tuff Wheels. The wheels 30 are quick release to allow the apparatus 10 to be converted from a tree stand or a field blind into an equipment carrier quickly and easily. As noted above, the cart can then be hitched to an ATV, mountain bike, or simply pulled or pushed by hand.

The perimeter frame member 22 is connected together with the platform 12 in several manners. At the rearward end of the platform 12, an "H"-shaped chair back frame 36 has left and right side frame members 36a and a transverse frame member 36b extending therebetween. The left and right side frame members 36a have their upper ends pivotally attached to a lower side of the rearward end portion of the top frame rail 22, and their lower ends pivotally attached to an upper end portion of left and right chair legs 38. The lower end portions of the left and right chair legs 38 are pivotally attached to the rearward-most reinforcing member 12b of the platform 12. A seat frame member 40 has a general "U"-shape with its free ends curved downwardly and each pivotally attached to a corresponding one of the left and right chair legs 38. When folded into position as shown in FIG. 4, the "H"-shaped chair back frame 36 forms the back portion of a seat, and the seat frame member 40 forms the seat portion of the seat. Both are covered with a preferably camouflage fabric (not shown) to form a comfortable folding seat which allows the seat frame member 40 to be folded into an upright position clear of the access opening 25 and the access door 32 to permit unobstructed entry and egress from the user enclosure 15. As will be described in greater detail below, the pivotal attachment of the "H"-shaped frame 36 to the chair legs 38 allows the collapsing of the user enclosure structure for folding into a compact form for transport.

The seat frame member 40 uses an offset pivot and is supported by a nylon strap hanger (not shown) attached to the top frame rail 22 to hold the seat frame member 40 up when a user is sitting on the seat portion. The chair legs 38 have non-bypass plates 42 welded to them so that the hinge formed by the pivotal attachment of the "H"-shaped chair back frame 36 to the chain legs 38 will not fold significantly rearwardly past their centers, but rather will fold inward (i.e., forward), as shown in FIG. 2 when the user enclosure 15 is folded to the collapsed position.

At the front end of the platform 12, a backsplash member 44 is pivotally coupled at its upper end to the lower side of the forward end portion of the top frame rail 22. The lower end portion of the backsplash member 44 is pivotally connected to the upper ends of two table legs 46. The lower ends of the table legs 46 are pivotally attached to the upward side of a forward end portion of the perimeter frame member 12a of the platform 12. A foot rest cross member 48 is rigidly attached to each of the table legs 46 at a position spaced upward from the platform 12 to provide structural integrity to the table legs 46 and also to provide a footrest for the user when sitting on the chair seat portion previously described.

The upper ends of the table legs 46 are pivotally attached to the lower end of the backsplash member 44 at a position above a lower edge 49 of the backsplash member and to a forward side thereof so as to prevent outward (i.e., forward) folding of the backsplash member 44 and table legs 46. The hinge point is formed in this manner to provide an anti-bypass function. A wing nut-like knob 52 is threadably attached to each table leg 46 at a position just below the lower edge 49 of the backsplash member 44 and arranged so that one of the wings thereof can be turned to lock the backsplash member 44 in place against inward (i.e., rearward) folding to help maintain the user enclosure 15 in a raised, fully expanded position and prevent it from collapsing under gravitational and other forces.

A utility shelf 50 is pivotally mounted to the backsplash member 44 and projects rearwardly toward the seat frame member 40. The utility shelf 50 is pivoted to fold upward into juxtaposition with the backsplash member for compact folding of the apparatus 10. When moved into the downward position shown in FIG. 4, the hinges of the utility shelf 50 are attached to the backsplash member 44 to limit the downward folding to a horizontal position so that the utility shelf provides a convenient shelf for holding objects of the user in the user enclosure 15.

The "H"-shaped chair back frame 36 and the chair legs 38 form a rearward hinge, and the backsplash member 44 and the table legs 46 form a forward hinge, which facilitate convenient folding and unfolding of the user enclosure 15 between a fully collapsed position shown in FIG. 1 and a fully erect or expanded position shown in FIGS. 3 and 4. When it is desired to collapse the user enclosure 15, the knobs 52 are turned to allow the backsplash member 44 and the table legs 46 to fold inward (i.e., rearward). This allows the "H"-shaped chair back frame 36 and the chair legs 38 to also fold inward (i.e., forward), and the top frame rail 22 to move downwardly toward the platform 12 and the partially collapsed position shown in FIG. 2. Further folding allows the user enclosure 15 to move into the fully collapsed position shown in FIGS. 1 and 11.

Four cables 54 are arranged in criss-cross pairs, one pair on the left side and one pair on the right side and extend between the top frame rail 22 and the perimeter frame member 12*a* of the platform 12 in an "X" fashion. The cables 54 have a length so that they become taut as the user enclosure 15 is moved with a snap movement into the fully expanded position to provide rigidity and strength to the user enclosure.

The top frame rail 22 is formed as a rectangle with radius corners approximately 22"×34" made from 1"×1" aluminum stock square tubing of the same materials used for the platform 12. The "H"-shaped chair back frame 36 and the chair legs 38 are also made from the same 1"×1" aluminum stock square tubing. The chair legs 38 are about 13" in length, and are hinged to the platform 12 and the "H"-shaped frame 36 using ¼"-20 furniture connectors. The chair legs 38 have the seat frame member 40 pivotally attached thereto using ¼"-20 bolts. The seat frame member 40 is formed from ¾" steel tubing.

The backsplash member 44 and the utility shelf 50 are formed of 0.060" thick aluminum sheeting. The table legs 46 are made from approximately 15.5" lengths of 1"×1" tubing of the same material described above. The table legs 46 are hinged to the backsplash member 44 using ¼" stainless steel bolts approximately 2.25" up from the lower edge 49 thereof. Steel bolts are used in an alternative embodiment. The footrest member 48 has a 15" length and is made from the same 1"×1" tubing described above.

The four cables 54 are manufactured from 3/16" stainless steel aircraft cable. Eyes are formed at both ends of each cable 54 using crimpable zinc-plated copper sleeves. The cables 54 are attached at their ends using ¼" bolts through the respective perimeter frame member 12*a* and the top frame rail 22. In an alternative embodiment, the ends of the cables 54 are attached using ¼" semi-hollow rivets.

As previously discussed, the telescoping ladder 14 has its upper end 16 pivotally attached to the platform 12 at a rearward end portion and lower side thereof. The attachment is made at a pair of attachment plates 56 projecting downward from the platform 12, as shown in FIGS. 3 and 4. The ladder 14 may have 5 to 8 ladder sections 14*a*, each having the same length and a lower step or rung 58, but with each rung having a different length. The length progressively decreases from the bottom-most rung to the top-most rung of the ladder 14.

Each of the ladder sections 14*a* consist of left and right side rails 60. By providing each ladder section 14*a* with a single rung 58 of a progressively decreasing length from the bottom to top of the ladder 14, the ladder sections can be nested together in a compact form or extended with a telescoping movement between the fully nested or collapsed position shown in FIG. 1 and the fully extended position shown in FIG. 5. Adjacent ladder sections 14*a* are arranged with the left and right side rails 60 of the lower ladder section positioned laterally outward of the corresponding left and right side rails 50 of the upper ladder section to which it is coupled so that upon collapsing the side rails of the upper ladder section move into the space between the side rails of the lower ladder section of the adjacent ladder sections.

Figure 10:
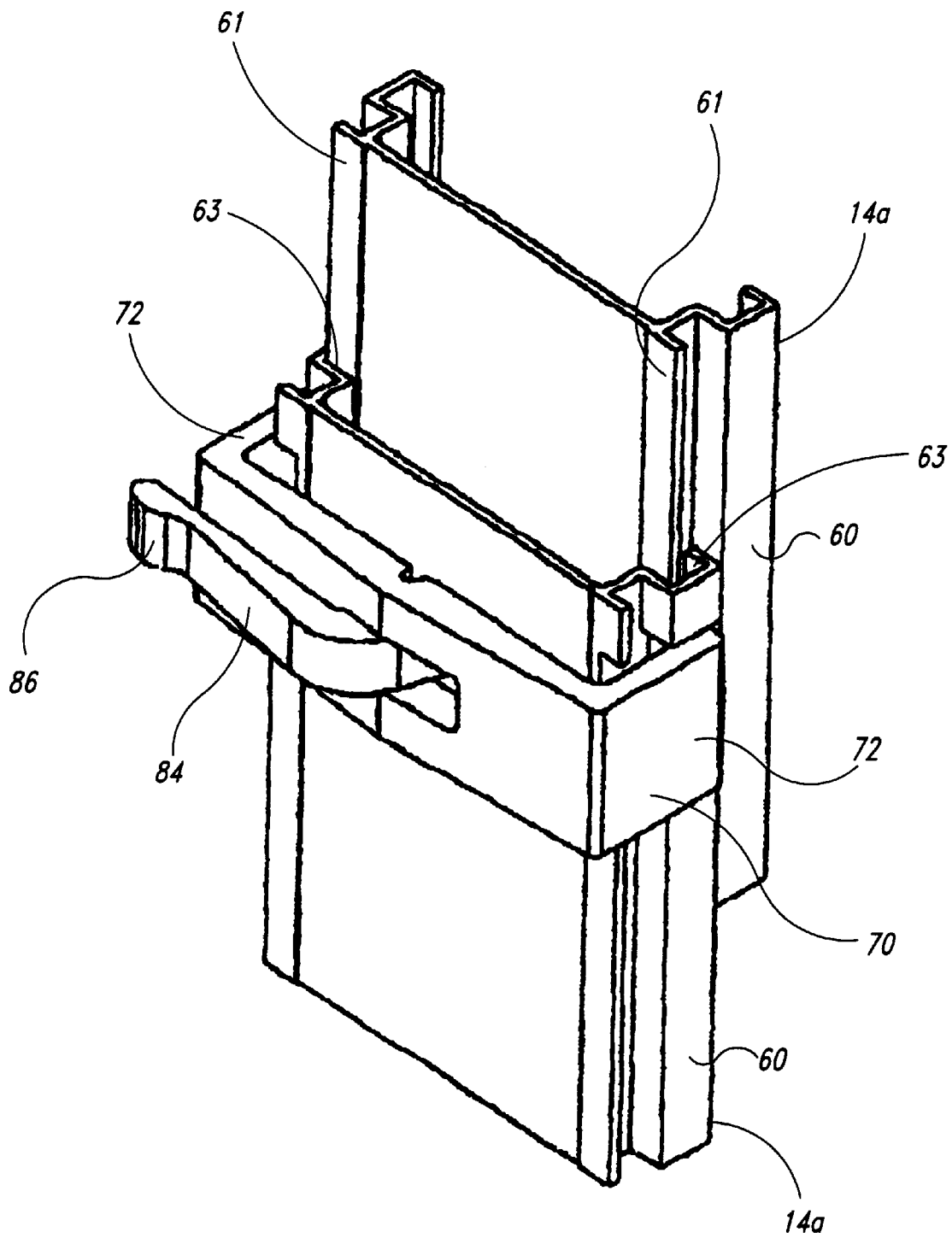
FIG. 10 is a perspective sectional view of two side rails of two adjacent ladder sections shown locked together using an alternative embodiment of the lock mechanism of FIG. 9.

As best seen in FIGS. 8*a* and 8*c*, to guide the movement and retain the adjacent ladder sections 14*a* together as they move, the left and right side rails 60 of the upper ladder section 14*a* has longitudinally extending front and rear edge flanges 61, as shown in FIG. 10, that are slidably disposed within a pair of opposing, longitudinally extending front and rear channels 63 in the side rails 60 of the adjacent lower ladder section. As such, the corresponding side rails 60 of the adjacent ladder sections 14*a* telescope one within the other. To prevent the adjacent ladder sections 14*a* from one pulling out of the other and separating, a stop (not shown) is provided that prevents the end of the side rails 60 of the upper ladder sections from unintentionally pulling free of the end of the corresponding side rail of the lower ladder section. The rung 58 of each ladder section 14*a* is positioned toward the lower end of the side rails 60 thereof and has each of its ends rigidly attached to a corresponding one of the side rails of the ladder section. The ladder sections 14*a* are sized so that one ladder section will easily slide relative to the adjacent ladder section to provide the desired telescoping movement. The rung 58 of each ladder section 14*a* is 1" shorter than the rung 58 of the adjacent ladder section therebelow.

To keep the ladder sections 14*a* from collapsing or moving relative to each other when not desired, each of the two side rails 60 of a ladder section 14*a* is lockable in position relative to the corresponding side rail 60 of the adjacent ladder section 14*a* by a pair of track wafers. Each pair includes an inwardly facing track wafer 62 rigidly attached to an inward face of the outwardly positioned side rail at its upper end, such as shown in FIG. 9 and FIGS. 8*a*–8*d*, and an outwardly facing track wafer 64 rigidly attached to an outward face of the inwardly positioned side rail at its lower end. When the adjacent ladder sections 14*a* are in the fully-extended position, the inward facing track wafer 62 is in position facing the outward facing track wafer 64. Each of the track wafers 62 and 64 has a plurality of locking flanges 66 extending transverse to the longitudinal axis of the ladder 14. The flanges 66 of the inward facing track wafers 62 project inward and the flanges 66 of the outward facing wafers 64 project outward. The flanges 66 of the inward and outward facing track wafers 62 and 64 are arranged to interlock when the flanges 66 of one track wafer engage the flanges of a correspondingly positioned track wafer. In such manner, the left and right side rails 60 of one ladder section 14*a* are locked against longitudinal movement relative to the left and right side rails 60 of the adjacent ladder section 14*a* to prevent unintended collapsing or extension of the telescoping ladder 14.

Figure 9:
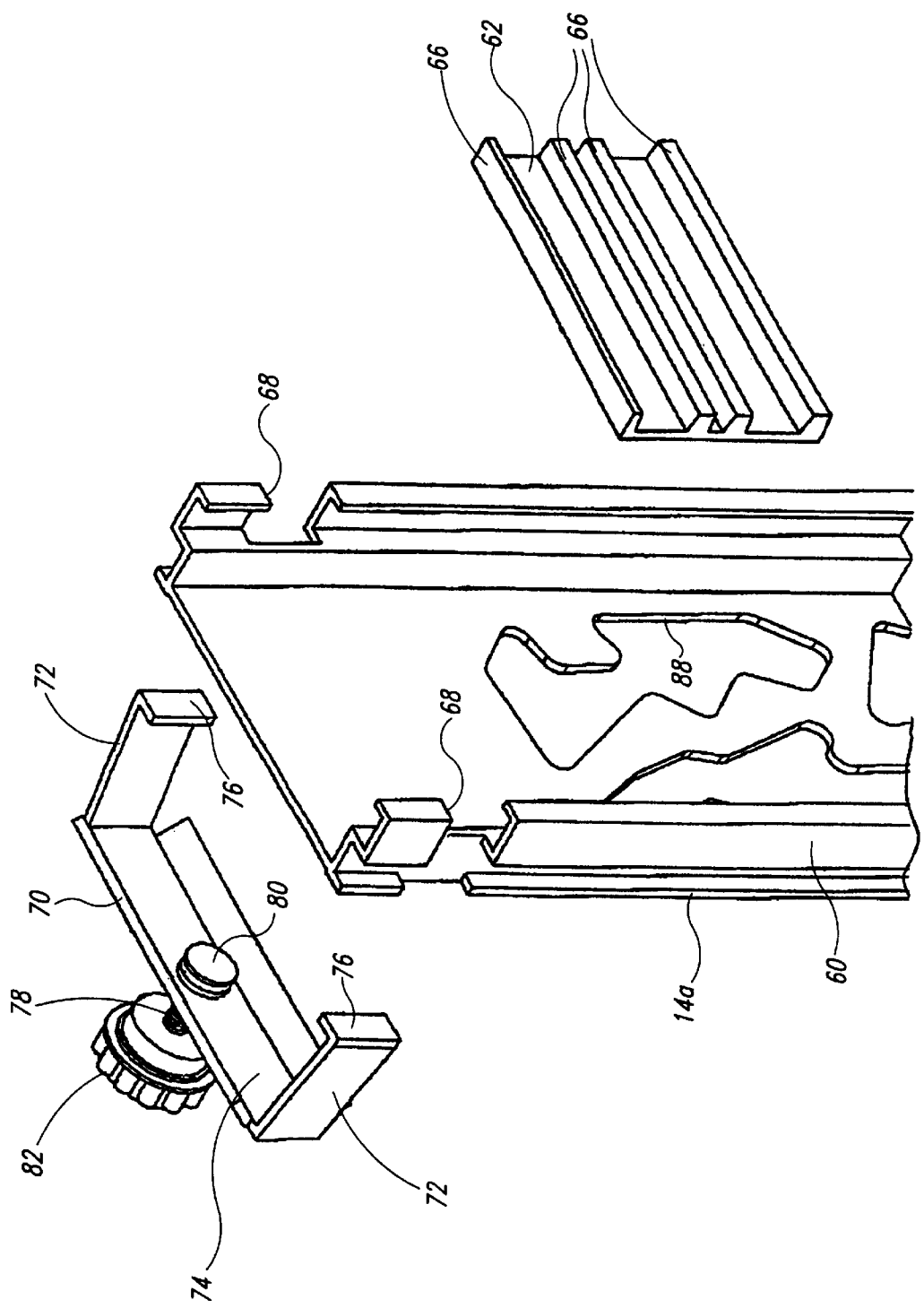
FIG. 9 is an enlarged perspective sectional view of an upper end portion of a ladder side rail and locking mechanism.

To maintain the corresponding pairs of track wafers 62 and 64 in locking engagement, the upper ends of the side rails 60 of a ladder section 14*a* each have a pair of front and rear edge notches 68 formed therein, as shown in FIG. 9. A clip lock 70 has front and rear arms 72 sized to fit within the notches 68. Each of the arms 72 is rigidly attached at one end to a cross-member 74. The other end of each of the arms 72 has a locking tab 76 extending inwardly therefrom to form an L-shape. The arms 72 of the lock clip 70 have sufficient length to extend through the notches 68 of the outwardly positioned side rail 60 of one frame section 14*a* and extend sufficiently inward so that the tabs 76 extend inward enough to engage the corresponding inwardly positioned side rail 60 of the adjacent frame section 14a (positioned immediately thereabove).

In one embodiment shown in FIG. 9, each locking clip 70 has a lock screw 78 with a member engagement end 80 on an inward end thereof positioned inward of the cross-member 74. A thumb knob 82 is attached to the outward end of the screw 78, outward of the cross-member 74. The screw 78 is threadably received in a threaded aperture of the cross-member 74 such that when the knob 82 is turned by hand, the screw 78 advances inward and engages the engagement end 80 against the outward face of the corresponding outwardly positioned side rail 60 of the adjacent ladder sections 14a and pulls the arms 72 of the clip member 70 outward. As such, the tabs 76 engaging the inwardly positioned side rail 60 of the adjacent ladder sections 14a, causes the upper end of the outwardly positioned side rail 60 to move inward and bring the flanges 66 of the inwardly facing track wafer 62 into locking engagement with the flanges 66 of the outwardly facing track wafer 64 and thereby lock the two side rails securely together against longitudinal movement relative to each other. The side rails 60 of adjacent ladder sections 14a (left side rails only being illustrated) are shown in a disengaged position in FIGS. 8a and 8b, and in a locked, engaged position in FIGS. 8c and 8d. The locking of the pairs of track wafers 62 and 64 together produces a rigid ladder. The process of disengaging the pairs of inwardly facing and outwardly facing track wafers 62 and 64 to allow them to pass by each other to collapse the ladder 14 (as shown in FIGS. 8c and 8d) is accomplished simply by manually unscrewing the screw 78 using the knob 82.

An alternative locking clip 70 is shown in FIG. 10 having generally the same construction except that the inward force which presses inward on the outwardly positioned side rail 60 is accomplished using a cam lever lock 84 rather than the screw 78. The cam lever lock 84 is pivotally mounted to the cross-member 74 and has an inwardly positioned cam to engage the outward face of the outwardly positioned side rail 60 to press it inward as the cam is rotated by rotation of an outwardly positioned thumb-actuated lever 86.

The side rails 60 of the ladder section 14 are extruded from 6061T6 aluminum and have a length of approximately 20.5 inches. Each of the rungs 58 is a 1"×1" square, with radius corners and a wall thickness of 0.060", and is extruded from 6063T6 aluminum. The rungs 58 have their ends welded to the inside walls of the corresponding side rails 60 of the ladder section 14a, at the lower end of the side rails using a MIG/Argon gas process. The track wafers 62 and 64 are spot welded to the corresponding side rails 60 of a ladder section 14 a using six spot welds on each track wafer.

The locking clip 70 is formed from 12-gauge thick steel. To improve the camouflage of the ladder, the side rails 60 of each ladder section 14a have cut outs 88 with varying shapes to soften the geometric appearance of the ladder 14. This provides additional camouflage plus reduces the weight of the ladder. The cut outs 88 can be cut out or stamped out of the side rails 60.

The upper end of the upper-most ladder section 14a of the ladder 14 is pivotally attached to the platform 12 at the attachment plates 56. The side rails 60 thereof are each pivotally attached using a ¼"-20 stainless steel bolt to permit the pivoting and attach the ladder 14 securely to the platform 12 when desired for use as a tree stand or for towing of the apparatus as an equipment carrier. To facilitate the pivoting action of the upper ends of the side rails 60 relative to the platform, the tops of the side rails of the upper-most ladder section 14a are rounded as needed to provide the necessary clearance.

To prevent the ladder 14 from unintentionally pivoting relative to the platform 12, the attachment flanges 56 of the platform 12 are each formed from a track wafer, of the type previously described for track wafers 62 and 64, with the flanges 66 thereof facing inward. The upper ends of the side rails 60 of the upper-most ladder section 14a each have a similar track wafer welded to the outward face of the side rail. The flanges of the track wafer extend longitudinally relative to the ladder 14, and generally transverse to the flanges 66 of the other track wafers 62 and 64 of the ladder. This orientation of the flanges of the track wafers at the upper end of the upper-most ladder section 14a allow the pivot bolts to be tightened to bring these ladder track wafers into locking engagement with the track wafers of the attachment flange 56 to lock the ladder against pivoting relative to the platform 12 when in a position extending generally perpendicular to the platform for use of the apparatus 10 as a tree stand, such as shown in FIG. 6. As with the other track wafers 62 and 64, the track wafers at the upper ends of the side rail 60 of the upper-most ladder section 14a are spot welded to the side rails.

The apparatus 10 is shown in use in FIG. 6 as a tree stand positioned against the tree 23. As shown in FIG. 4, the rearward end portion of the perimeter frame member 12a of the platform 12 and the rearward end portion of the top frame rail 22 each have a pair of pointed contact members 88 projecting rearwardly therefrom for resting against the tree 23 to inhibit side slipping of the user enclosure 15 when leaning against the tree. To securely hold the user enclosure 15 in place against the tree 23, nylon straps 90 are used at the two rear quarter tangents of the perimeter frame member 12a of the platform 12 and at the two rear quarter tangents of the top frame rail 22. The straps 90 are made from two strap sections of a 1" wide nylon web with one strap section having a hook at one end and the other an over-center buckle handle to provide a securing strap which holds the user enclosure 15 securely against the tree 23. To further secure the apparatus 10 against the tree 23, the third ladder section 14a from the bottom of the ladder 14 has an "H"-shaped bracket 92 which is mounted to and pivots on the ladder section to provide an adjustable, secure mounting point for resting against the tree 23. A nylon web strap 94 of two sections is fastened to the bracket 92 and encircles the tree. The two sections buckle together to further secure the ladder 14 to the tree.

As previously discussed, the user enclosure 15 is useful as a field blind when the ladder 14 is removed and the outriggers 24 and 26 are added by securing them to the rearward and forward end portions of the perimeter frame member 12a of the platform. The outriggers 24 and 26 are formed using two pieces of 1"×1"×0.060" tubing fastened under the perimeter frame member 12a to provide additional stability to the platform 12 when sitting upon the ground for use as a field blind, as shown in FIG. 16, and in use with the fabric covers 17, 19 and 21 in place in FIG. 17.

The apparatus 10, as previously described, can be used as an equipment carrier by attachment of the wheels 30 to the left and right side axle hubs 34 to form a cart. When the apparatus 10 has a ladder 14 attached, the ladder can be pivoted into a substantially parallel relation to the platform 12 and used for pulling the cart by hand or by some other means, as discussed above. When the apparatus 10 does not have a ladder attached, the handle 13 is provided by attaching the outriggers 24 and 26, respectively, to a forward end of the platform 12 and to a forward end of the top frame rail 22, and also to each other to define the handle. As shown in FIG. 19, the curved ends of the outriggers 24 and 26 point laterally inward and toward each other when attached to form the handle 13. One end of each of the outriggers 24 and 26 is positioned opposing the other in a coaxial arrangement and the opposing ends are snapped together. The handle 13 formed thereby is shown being grasped by a user in FIG. 20.

The outriggers 24 and 26 are formed using 1"×1"×0.060" aluminum tubes approximately 22.75" long. In an alternative embodiment, the outriggers are formed by using two 1"×1"×0.12 aluminum tubes, approximately 48" long. The tubes can be attached to the underside of the platform 12 on the one side thereof for carrying.

It will be appreciated that, although specific embodiments of the invention have been described herein for purposes of illustration, various modifications may be made without departing from the spirit and scope of the invention. Accordingly, the invention is not limited except as by the appended claims.

What is claimed is:

1. A portable and collapsible user enclosure, comprising:
a platform configured to support a user thereon within the user enclosure;
a top frame member defining an upward opening of the user enclosure;
a first hinge assembly having an upper first hinge member with an upper end portion pivotally connected to the top frame member and a lower end portion, and a lower first hinge member with a lower end portion pivotally connected to the platform and an upper end portion pivotally connected to the lower end portion of the upper first hinge member;
a second hinge assembly having an upper second hinge member with an upper end portion pivotally connected to the top frame member and a lower end portion, and a lower second hinge member with a lower end portion pivotally connected to the platform and an upper end portion pivotally connected to the lower end portion of the upper second hinge member, the first and second hinge assemblies being foldable to move one of the top frame member and the platform toward the other to collapse the user enclosure; and
a telescoping ladder pivotally attachable to the platform, the ladder having a longitudinal axis and a plurality of ladder sections telescopically connected together and movable along the ladder axis between a fully extended position and a fully collapsed position, each ladder section including first and second side rails and a rung extending therebetween, adjacent pairs of ladder sections having one of the pair of ladder sections with the first and second side rails thereof positioned inward of the first and second side rails of the other of the pair of ladder sections, the first and second side rails of the one of the pair of ladder sections being slidably retained by the respective first and second side rails of the other of the pair of ladder sections for sliding movement along the ladder axis, the first and second side rails of the one of the pair of ladder sections having first lock members, each with a laterally outward facing locking engagement face, and the first and second side rails of the other of the pair of ladder sections having second lock members, each with a laterally inward facing locking engagement face, the first lock member engagement faces being positioned on the first and second side rails of the one of the pair of ladder sections and the second lock member engagement faces being positioned on the first and second side rails of the other of the pair of ladder sections to position the first lock member engagement faces in face-to-face engagement with the respective second lock member engagement faces to lockably engage each other to prevent movement of the first and second side rails of the pair of ladder sections along the ladder axis when the ladder is in the fully extended position, at least one of the first side rails of the pair of ladder sections being laterally movable relative to the other first side rail to move the first and second lock member engagement faces of the first side rails of the pair of ladder sections into face-to-face locking engagement with each other, and at least one of the second side rails of the pair of ladder sections being laterally movable relative to the other second side rail to move the first and second lock member engagement faces of the second side rails of the pair of ladder sections into face-to-face locking engagement with each other.

2. The user enclosure of claim 1 further including first and second lock actuators for the adjacent pairs of ladder sections, the first lock actuator being positioned to laterally move the one first side rail of the pair of ladder sections toward the other first side rail to bring the first and second lock member engagement faces of the first side rails of the pair of ladder sections into face-to-face locking engagement, and the second lock actuator being positioned to laterally move the one second side rail of the pair of ladder sections toward the other second side rail to bring the first and second lock member engagement faces of the second side rails of the pair of ladder sections into face-to-face locking engagement.

3. The user enclosure of claim 2 wherein the first and second lock member engagement faces each have engagement projections, with the engagement projections of the first and second lock member engagement faces of the first side rails of the pair of ladder sections projecting toward the other and with the engagement projections of the first and second lock member engagement faces of the second side rails of the pair of ladder sections projecting toward the other.

4. The user enclosure of claim 3 wherein the engagement projections of the first and second lock member engagement of the first and second side rails of the pair of ladder sections extend at an angle other than zero relative to the ladder axis.

5. The user enclosure of claim 2 wherein the first and second lock actuators each include a manually movable actuator member, the actuator member of the first lock actuator being manually operable to laterally move the one first side rail toward the other first side rail to bring the first and second lock member engagement faces of the first side rails of the pair of ladder sections into locking engagement, and the actuator member of the second lock actuator being manually operable to laterally move the one second side rail toward the other second side rail to bring the first and second lock member engagement faces of the second side rails of the pair of ladder sections into locking engagement.

6. The user enclosure of claim 5 wherein the actuator members of the first and second lock actuators include threaded screws.

7. The user enclosure of claim 5 wherein the actuator members of the first and second lock actuators include cams.

8. A portable and collapsible user enclosure, comprising:
a platform configured to support a user thereon within the user enclosure;

a top frame member defining an upward opening of the user enclosure;

a first hinge assembly having an upper first hinge member with an upper end portion pivotally connected to the top frame member and a lower end portion, and a lower first hinge member with a lower end portion pivotally connected to the platform and an upper end portion pivotally connected to the lower end portion of the upper first hinge member;

a second hinge assembly having an upper second hinge member with an upper end portion pivotally connected to the top frame member and a lower end portion, and a lower second hinge member with a lower end portion pivotally connected to the platform and an upper end portion pivotally connected to the lower end portion of the upper second hinge member, the first and second hinge assemblies being foldable to move one of the top frame member and the platform toward the other to collapse the user enclosure;

a telescoping ladder pivotally attachable to the platform, the ladder having a longitudinal axis and a plurality of ladder sections telescopically connected together and movable along the ladder axis between a fully extended position and a fully collapsed position, each ladder section including first and second side rails and a rung extending therebetween, adjacent pairs of ladder sections having one of the pair of ladder sections with the first and second side rails thereof positioned inward of the first and second side rails of the other of the pair of ladder sections, the first and second side rails of the one of the pair of ladder sections being slidably retained by the respective first and second side rails of the other of the pair of ladder sections for sliding movement along the ladder axis, the first and second side rails of the one of the pair of ladder sections having first lock members, each with a locking engagement face, and the first and second side rails of the other of the pair of ladder sections having second lock members, each with a locking engagement face, the first lock member engagement faces being positioned on the first and second side rails of the one of the pair of ladder sections and the second lock member engagement faces being positioned on the first and second side rails of the other of the pair of ladder sections to position the first lock member engagement faces in face-to-face engagement with the respective second lock member engagement faces to lockably engage each other when the ladder is in the fully extended position; and first and second lock actuators for the adjacent pairs of ladder sections, the first lock actuator being positioned to move the first and second lock member engagement faces of the first side rails of the pair of ladder sections into face-to-face locking engagement, and the second lock actuator being positioned to move the first and second lock member engagement faces of the second side rails of the pair of ladder sections into face-to-face locking engagement, the first and second lock actuators each including a manually movable actuator member, the actuator member of the first lock actuator being manually operable to move the first and second lock member engagement faces of the first side rails of the pair of ladder sections into locking engagement, and the actuator member of the second lock actuator being manually operable to move the first and second lock member engagement faces of the second side rails of the pair of ladder sections into locking engagement, the actuator members of the first and second lock actuators including cams, with the cam of the actuator member of the first lock actuator being positioned to engage and operable to move the first side rail of the one of the pair of ladder sections toward the first side rail of the other of the pair of ladder sections to move the first and second lock member engagement faces of the first side rails of the pair of ladder sections into locking engagement, and the cam of the actuator member of the second lock actuator being positioned to engage and operable to move the second side rail of the one of the pair of ladder sections toward the second side rail of the other of the pair of ladder sections to move the first and second lock member engagement faces of the second side rails of the pair of ladder sections into locking engagement.

9. The user enclosure of claim 8 wherein the actuator member of the first lock actuator further includes a manually rotatable lever coupled to the cam of the first lock actuator and rotatable between an unlocked position and a locked position, movement of the lever of the first lock actuator to the locked position moving the cam of the first lock actuator to move the first side rail of the one of the pair of ladder sections toward the first side rail of the other of the pair of ladder sections and thereby move the first and second lock member engagement faces of the first side rails of the pair of ladder sections into locking engagement, and the actuator of the second lock actuator further includes a manually rotatable lever coupled to the cam of the second lock actuator and rotatable between an unlocked position and a locked position, movement of the lever of the second lock actuator to the locked position moving the cam of the second lock actuator to move the second side rail of the one of the pair of ladder sections toward the second side rail of the other of the pair of ladder sections and thereby move the first and second lock member engagement faces of the second side rails of the pair of ladder sections into locking engagement.

10. The user enclosure of claim 9 wherein the first and second lock actuators each further include a clip, the clip of the first lock actuator rotatably supporting the lever of the first lock actuator and having a pair of arms engaging one of the first side rails of the one of the pair of ladder sections and positioning the cam of the first lock actuator to engage the first side rail of the other of the pair of ladder sections and thereby move the first and second lock member engagement faces of the first side rails of the pair of ladder sections into locking engagement, and the clip of the second lock actuator rotatably supporting the lever of the second lock actuator and having a pair of arms engaging one of the second side rails of the one of the pair of ladder sections and positioning the cam of the second lock actuator to engage the second side rail of the other of the pair of ladder sections and thereby move the first and second lock member engagement faces of the second side rails of the pair of ladder sections into locking engagement.

11. A portable and collapsible user enclosure, comprising:

a platform configured to support a user thereon within the user enclosure;

a top frame member defining an upward opening of the user enclosure;

a first hinge assembly having an upper first hinge member with an upper end portion pivotally connected to the top frame member and a lower end portion, and a lower first hinge member with a lower end portion pivotally connected to the platform and an upper end portion pivotally connected to the lower end portion of the upper first hinge member;

a second hinge assembly having an upper second hinge member with an upper end portion pivotally connected to the top frame member and a lower end portion, and a lower second hinge member with a lower end portion pivotally connected to the platform and an upper end portion pivotally connected to the lower end portion of the upper second hinge member, the first and second hinge assemblies being foldable to move one of the top frame member and the platform toward the other to collapse the user enclosure;

a telescoping ladder pivotally attachable to the platform, the ladder having a longitudinal axis and a plurality of ladder sections telescopically connected together and movable along the ladder axis between a fully extended position and a fully collapsed position, each ladder section including first and second side rails and a rung extending therebetween, adjacent pairs of ladder sections having one of the pair of ladder sections with the first and second side rails thereof positioned inward of the first and second side rails of the other of the pair of ladder sections, the first and second side rails of the one of the pair of ladder sections being slidably retained by the respective first and second side rails of the other of the pair of ladder sections for sliding movement along the ladder axis, the first and second side rails of the one of the pair of ladder sections having first lock members, each with a locking engagement face, and the first and second side rails of the other of the pair of ladder sections having second lock members, each with a locking engagement face, the first lock member engagement faces being positioned on the first and second side rails of the one of the pair of ladder sections and the second lock member engagement faces being positioned on the first and second side rails of the other of the pair of ladder sections to position the first lock member engagement faces in face-to-face engagement with the respective second lock member engagement faces to lockably engage each other when the ladder is in the fully extended position; and first and second lock actuators for the adjacent pairs of ladder sections, the first lock actuator being positioned to move the first and second lock member engagement faces of the first side rails of the pair of ladder sections into face-to-face locking engagement, and the second lock actuator being positioned to move the first and second lock member engagement faces of the second side rails of the pair of ladder sections into face-to-face locking engagement, the first and second lock actuators each including a manually movable actuator member, the actuator member of the first lock actuator being manually operable to move the first and second lock member engagement faces of the first side rails of the pair of ladder sections into locking engagement, and the actuator member of the second lock actuator being manually operable to move the first and second lock member engagement faces of the second side rails of the pair of ladder sections into locking engagement, the first and second lock actuators each further including a clip, the clip of the first lock actuator supporting the actuator member of the first lock actuator and having a pair of arms engaging one of the first side rails of the one of the pair of ladder sections and positioning the actuator member of the first lock actuator to engage the first side rail of the other of the pair of ladder sections and thereby move the first and second lock member engagement faces of the first side rails of the pair of ladder sections into locking engagement, and the clip of the second lock actuator supporting the actuator member of the second lock actuator and having a pair of arms engaging one of the second side rails of the one of the pair of ladder sections and positioning the actuator member of the second lock actuator to engage the second side rail of the other of the pair of ladder sections and thereby move the first and second lock member engagement faces of the second side rails of the pair of ladder sections into locking engagement.

12. A portable and collapsible user enclosure, comprising:

a platform configured to support a user thereon within the user enclosure;

a top frame member defining an upward opening of the user enclosure;

a first hinge assembly having an upper first hinge member with an upper end portion pivotally connected to the top frame member and a lower end portion, and a lower first hinge member with a lower end portion pivotally connected to the platform and an upper end portion pivotally connected to the lower end portion of the upper first hinge member;

a second hinge assembly having an upper second hinge member with an upper end portion pivotally connected to the top frame member and a lower end portion, and a lower second hinge member with a lower end portion pivotally connected to the platform and an upper end portion pivotally connected to the lower end portion of the upper second hinge member, the first and second hinge assemblies being foldable to move one of the top frame member and the platform toward the other to collapse the user enclosure;

a telescoping ladder pivotally attachable to the platform, the ladder having a longitudinal axis and a plurality of ladder sections telescopically connected together and movable along the ladder axis between a fully extended position and a fully collapsed position, each ladder section including first and second side rails and a rung extending therebetween, adjacent pairs of ladder sections having one of the pair of ladder sections with the first and second side rails thereof positioned inward of the first and second side rails of the other of the pair of ladder sections, the first and second side rails of the one of the pair of ladder sections being slidably retained by the respective first and second side rails of the other of the pair of ladder sections for sliding movement along the ladder axis, the first and second side rails of the one of the pair of ladder sections having first lock members and the first and second side rails of the other of the pair of ladder sections having second lock members, the first and second lock members being positioned on the first and second side rails of the pair of ladder sections to be in position for the respective first and second lock members to lockably engage each other when the ladder is in the fully extended position; and first and second lock actuators for the adjacent pairs of ladder sections, the first lock actuator being positioned to move the first and second lock members of the first side rails of the pair of ladder sections into locking engagement, and the second lock actuator being positioned to move the first and second lock members of the second side rails of the pair of ladder sections into locking engagement, the first and second lock actuators each including a manually movable actuator member, the actuator member of the first lock actuator being manually operable to move the first and second lock members of the first side rails of the pair of ladder sections into locking engagement, and the actuator member of the second lock actuator being manually operable to move the first and second lock members of the second side rails of the pair of ladder sections into locking engagement, the actuator members of the first and second lock actuators including cams, with the cam of the actuator member of the first lock actuator positioned to engage and operable to move the first side rail of the one of the pair of ladder sections toward the first side rail of the other of the pair of ladder sections to move the first and second lock members of the first side rails of the pair of ladder sections into locking engagement, and with the cam of the actuator member of the second lock actuator is positioned to engage and operable to move the second side rail of the one of the pair of ladder sections toward the second side rail of the other of the pair of ladder sections to move the first and second lock members of the second side rails of the pair of ladder sections into locking engagement, the actuator member of the first lock actuator further including a manually rotatable lever coupled to the cam of the first lock actuator and rotatable between an unlocked position and a locked position, movement of the lever of the first lock actuator to the locked position moving the cam of the first lock actuator to move the first side rail of the one of the pair of ladder sections toward the first side rail of the other of the pair of ladder sections and thereby move the first and second lock members of the first side rails of the pair of ladder sections into locking engagement, and the actuator of the second lock actuator further including a manually rotatable lever coupled to the cam of the second lock actuator and rotatable between an unlocked position and a locked position, movement of the lever of the second lock actuator to the locked position moving the cam of the second lock actuator to move the second side rail of the one of the pair of ladder sections toward the second side rail of the other of the pair of ladder sections and thereby move the first and second lock members of the second side rails of the pair of ladder sections into locking engagement, the first and second lock actuators each further including a clip, the clip of the first lock actuator rotatably supporting the lever of the first lock actuator and having a pair of arms engaging one of the first side rails of the one of the pair of ladder sections and positioning the cam of the first lock actuator to engage the first side rail of the other of the pair of ladder sections and thereby move the first and second lock members of the first side rails of the pair of ladder sections into locking engagement, and the clip of the second lock actuator rotatably supporting the lever of the second lock actuator and having a pair of arms engaging one of the second side rails of the one of the pair of ladder sections and positioning the cam of the second lock actuator to engage the second side rail of the other of the pair of ladder sections and thereby move the first and second lock members of the second side rails of the pair of ladder sections into locking engagement.

13. A portable and collapsible user enclosure, comprising:
a platform configured to support a user thereon;
a frame assembly defining a user enclosure and positioned above the platform when the user is in the user enclosure; and
a telescoping ladder attachable to the platform, the ladder having a longitudinal axis and a plurality of ladder sections telescopically connected together and movable along the ladder axis between an extended position and a collapsed position, each ladder section including first and second side rails and a rung extending therebetween, adjacent pairs of ladder sections having one of the pair of ladder sections with the first and second side rails thereof positioned inward of the first and second side rails of the other of the pair of ladder sections, the first and second side rails of the one of the pair of ladder sections being retained adjacent to the respective first and second side rails of the other of the pair of ladder sections for movement along the ladder axis, the first and second side rails of the one of the pair of ladder sections having first lock members, each with a laterally outward facing locking engagement face, and the first and second side rails of the other of the pair of ladder sections having second lock members, each with a laterally inward facing locking engagement face, the first lock member engagement faces being positioned on the first and second side rails of the one of the pair of ladder sections and the second lock member engagement faces being positioned on the first and second side rails of the other of the pair of ladder sections to position the first lock member engagement faces in face-to-face engagement with the respective second lock member engagement faces to lockably engage each other to prevent movement of the first and second side rails of the pair of ladder sections along the ladder axis when the ladder is in the extended position, at least one of the first side rails of the pair of ladder sections being laterally movable relative to the other first side rail to move the first and second lock member engagement faces of the first side rails of the pair of ladder sections into face-to-face locking engagement with each other, and at least one of the second side rails of the pair of ladder sections being laterally movable relative to the other second side rail to move the first and second lock member engagement faces of the second side rails of the pair of ladder sections into face-to-face locking engagement with each other.

14. The user enclosure of claim 13, further including first and second lock actuators for the adjacent pairs of ladder sections, the first lock actuator being positioned to laterally move the one first side rail of the pair of ladder sections toward the other first side rail to bring the first and second lock member engagement faces of the first side rails of the pair of ladder sections into face-to-face locking engagement, and the second lock actuator being positioned to laterally move the one second side rail of the pair of ladder sections toward the other second side rail to bring the first and second lock member engagement faces of the second side rails of the pair of ladder sections into face-to-face locking engagement.

15. The user enclosure of claim 14 wherein the first lock actuator engages the first side rails of the pair of ladder sections and is operable to laterally move the one first side rail toward the other first side rail and clamp the first and second lock member engagement faces of the first side rails of the pair of ladder sections in face-to-face locking engagement, and the second lock actuator engages the second side rails of the pair of ladder sections and is operable to laterally move the one second side rail toward the other second side rail and clamp the first and second lock member engagement faces of the second side rails of the pair of ladder sections in face-to-face locking engagement.

16. The user enclosure of claim 14 wherein the first and second lock member engagement faces each have engagement projections, with the engagement projections of the first and second lock member engagement faces of the first side rails of the pair of ladder sections projecting toward the other and with the engagement projections of the first and second lock member engagement faces of the second side rails of the pair of ladder sections projecting toward the other.

17. The user enclosure of claim 16 wherein the engagement projections of the first and second lock member engagement of the first and second side rails of the pair of ladder sections extend at an angle other than zero relative to the ladder axis.

18. The user enclosure of claim 14 wherein the first and second lock actuators each include a manually movable actuator member, the actuator member of the first lock actuator being manually operable to laterally move the one first side rail toward the other first side rail to bring the first and second lock member engagement faces of the first side rails of the pair of ladder sections into locking engagement, and the actuator member of the second lock actuator being manually operable to laterally move the one second side rail toward the other second side rail to bring the first and second lock member engagement faces of the second side rails of the pair of ladder sections into locking engagement.

19. The user enclosure of claim 18 wherein the actuator members of the first and second lock actuators include cams.

20. A portable and collapsible user enclosure, comprising:
a platform configured to support a user thereon;
a frame assembly defining a user enclosure and positioned above the platform when the user is in the user enclosure;
a telescoping ladder attachable to the platform, the ladder having a longitudinal axis and a plurality of ladder sections telescopically connected together and movable along the ladder axis between an extended position and a collapsed position, each ladder section including first and second side rails and a rung extending therebetween, adjacent pairs of ladder sections having one of the pair of ladder sections with the first and second side rails thereof positioned inward of the first and second side rails of the other of the pair of ladder sections, the first and second side rails of the one of the pair of ladder sections being retained adjacent to the respective first and second side rails of the other of the pair of ladder sections for movement along the ladder axis, the first and second side rails of the one of the pair of ladder sections having first lock members, each with a locking engagement face, and the first and second side rails of the other of the pair of ladder sections having second lock members, each with a locking engagement face, the first lock member engagement faces being positioned on the first and second side rails of the one of the pair of ladder sections and the second lock member engagement faces being positioned on the first and second side rails of the other of the pair of ladder sections to position the first lock member engagement faces in face-to-face engagement with the respective second lock member engagement faces to lockably engage each other when the ladder is in the extended position; and
first and second lock actuators for the adjacent pairs of ladder sections, the first lock actuator being positioned to move the first and second lock member engagement faces of the first side rails of the pair of ladder sections into face-to-face locking engagement, and the second lock actuator being positioned to move the first and second lock member engagement faces of the second side rails of the pair of ladder sections into face-to-face locking engagement, the first and second lock actuators each including a manually movable actuator member, the actuator member of the first lock actuator being manually operable to move the first and second lock member engagement faces of the first side rails of the pair of ladder sections into locking engagement, and the actuator member of the second lock actuator being manually operable to move the first and second lock member engagement faces of the second side rails of the pair of ladder sections into locking engagement, the actuator members of the first and second lock actuators including cams, with the cam of the actuator member of the first lock actuator being positioned to engage and operable to move the first side rail of the one of the pair of ladder sections toward the first side rail of the other of the pair of ladder sections to move the first and second lock member engagement faces of the first side rails of the pair of ladder sections into locking engagement, and the cam of the actuator member of the second lock actuator being positioned to engage and operable to move the second side rail of the one of the pair of ladder sections toward the second side rail of the other of the pair of ladder sections to move the first and second lock member engagement faces of the second side rails of the pair of ladder sections into locking engagement.

21. The user enclosure of claim 20 wherein the actuator member of the first lock actuator further includes a manually rotatable lever coupled to the cam of the first lock actuator and rotatable between an unlocked position and a locked position, movement of the lever of the first lock actuator to the locked position moving the cam of the first lock actuator to move the first side rail of the one of the pair of ladder sections toward the first side rail of the other of the pair of ladder sections and thereby move the first and second lock member engagement faces of the first side rails of the pair of ladder sections into locking engagement, and the actuator of the second lock actuator further includes a manually rotatable lever coupled to the cam of the second lock actuator and rotatable between an unlocked position and a locked position, movement of the lever of the second lock actuator to the locked position moving the cam of the second lock actuator to move the second side rail of the one of the pair of ladder sections toward the second side rail of the other of the pair of ladder sections and thereby move the first and second lock member engagement faces of the second side rails of the pair of ladder sections into locking engagement.

22. The user enclosure of claim 21 wherein the first and second lock actuators each further include a clip, the clip of the first lock actuator rotatably supporting the lever of the first lock actuator and having a pair of arms engaging one of the first side rails of the one of the pair of ladder sections and positioning the cam of the first lock actuator to engage the first side rail of the other of the pair of ladder sections and thereby move the first and second lock member engagement faces of the first side rails of the pair of ladder sections into locking engagement, and the clip of the second lock actuator rotatably supporting the lever of the second lock actuator and having a pair of arms engaging one of the second side rails of the one of the pair of ladder sections and positioning the cam of the second lock actuator to engage the second side rail of the other of the pair of ladder sections and thereby move the first and second lock member engagement faces of the second side rails of the pair of ladder sections into locking engagement.

23. A portable and collapsible user enclosure, comprising:
a platform configured to support a user thereon;
a frame assembly defining a user enclosure and positioned above the platform when the user is in the user enclosure;
a telescoping ladder attachable to the platform, the ladder having a longitudinal axis and a plurality of ladder sections telescopically connected together and movable along the ladder axis between an extended position and a collapsed position, each ladder section including first and second side rails and a rung extending therebetween, adjacent pairs of ladder sections having one of the pair of ladder sections with the first and second side rails thereof positioned inward of the first and second side rails of the other of the pair of ladder sections, the first and second side rails of the one of the pair of ladder sections being retained adjacent to the respective first and second side rails of the other of the pair of ladder sections for movement along the ladder axis, the first and second side rails of the one of the pair of ladder sections having first lock members, each with a locking engagement face, and the first and second side rails of the other of the pair of ladder sections having second lock members, each with a locking engagement face, the first lock member engagement faces being positioned on the first and second side rails of the one of the pair of ladder sections and the second lock member engagement faces being positioned on the first and second side rails of the other of the pair of ladder sections to position the first lock member engagement faces in face-to-face engagement with the respective second lock member engagement faces to lockably engage each other when the ladder is in the extended position; and
first and second lock actuators for the adjacent pairs of ladder sections, the first lock actuator being positioned to move the first and second lock member engagement faces of the first side rails of the pair of ladder sections into face-to-face locking engagement, and the second lock actuator being positioned to move the first and second lock member engagement faces of the second side rails of the pair of ladder sections into face-to-face locking engagement, the first and second lock actuators each including a manually movable actuator member, the actuator member of the first lock actuator being manually operable to move the first and second lock member engagement faces of the first side rails of the pair of ladder sections into locking engagement, and the actuator member of the second lock actuator being manually operable to move the first and second lock member engagement faces of the second side rails of the pair of ladder sections into locking engagement, the first and second lock actuators each further including a clip, the clip of the first lock actuator supporting the actuator member of the first lock actuator and having a pair of arms engaging one of the first side rails of the one of the pair of ladder sections and positioning the actuator member of the first lock actuator to engage the first side rail of the other of the pair of ladder sections and thereby move the first and second lock member engagement faces of the first side rails of the pair of ladder sections into locking engagement, and the clip of the second lock actuator supporting the actuator member of the second lock actuator and having a pair of arms engaging one of the second side rails of the one of the pair of ladder sections and positioning the actuator member of the second lock actuator to engage the second side rail of the other of the pair of ladder sections and thereby move the first and second lock member engagement faces of the second side rails of the pair of ladder sections into locking engagement.

24. A portable and collapsible user enclosure, comprising:
a platform configured to support a user thereon;
a frame assembly defining a user enclosure and positioned above the platform when the user is in the user enclosure;
a telescoping ladder attachable to the platform, the ladder having a longitudinal axis and a plurality of ladder sections telescopically connected together and movable along the ladder axis between an extended position and a collapsed position, each ladder section including first and second side rails and a rung extending therebetween, the first and second side rails of the one of the pair of ladder sections being retained adjacent to the respective first and second side rails of the other of the pair of ladder sections for movement along the ladder axis, the first and second side rails of the one of the pair of ladder sections having first lock members, each with a locking engagement face, and the first and second side rails of the other of the pair of ladder sections having second lock members, each with a locking engagement face, the first lock member engagement faces being positioned on the first and second side rails of the one of the pair of ladder sections and the second lock member engagement faces being positioned on the first and second side rails of the other of the pair of ladder sections to position the first lock member engagement faces in face-to-face engagement with the respective second lock member engagement faces to lockably engage each other when the ladder is in the extended position; and
first and second lock actuators for the adjacent pairs of ladder sections, the first lock actuator being positioned to engage and operable to move the first side rail of the one of the pair of ladder sections toward the first side rail of the other of the pair of ladder sections to move the first and second lock member engagement faces of the first side rails of the pair of ladder sections into face-to-face locking engagement, and the second lock actuator being positioned to engage and operable to move the second side rail of the one of the pair of ladder sections toward the second side rail of the other of the pair of ladder sections to move the first and second lock member engagement faces of the second side rails of the pair of ladder sections into face-to-face locking engagement.

25. A portable and collapsible user enclosure, comprising:
a platform configured to support a user thereon;
a frame assembly defining a user enclosure and positioned above the platform when the user is in the user enclosure;
a telescoping ladder attachable to the platform, the ladder having a longitudinal axis and a plurality of ladder sections telescopically connected together and movable along the ladder axis between an extended position and a collapsed position, each ladder section including first and second side rails and a rung extending therebetween, the first and second side rails of the one of the pair of ladder sections being retained adjacent to the respective first and second side rails of the other of the pair of ladder sections for movement along the ladder axis, the first and second side rails of the one of the pair of ladder sections having first lock members, each with a locking engagement face, and the first and second side rails of the other of the pair of ladder sections having second lock members, each with a locking engagement face, the first lock member engagement faces being positioned on the first and second side rails of the one of the pair of ladder sections and the second lock member engagement faces being positioned on the first and second side rails of the other of the pair of ladder sections to position the first lock member engagement faces in face-to-face engagement with the respective second lock member engagement faces to lockably engage each other when the ladder is in the extended position; and first and second lock actuators for the adjacent pairs of ladder sections, the first lock actuator being positioned to move the first and second lock member engagement faces of the first side rails of the pair of ladder sections into face-to-face locking engagement, and the second lock actuator being positioned to move the first and second lock member engagement faces of the second side rails of the pair of ladder sections into face-to-face locking engagement, the first and second lock actuators each including an actuator member, the actuator member of the first lock actuator being operable to move the first and second lock member engagement faces of the first side rails of the pair of ladder sections into locking engagement, and the actuator member of the second lock actuator being operable to move the first and second lock member engagement faces of the second side rails of the pair of ladder sections into locking engagement, the first and second lock actuators each further including a clip, the clip of the first lock actuator supporting the actuator member of the first lock actuator and having a pair of arms engaging one of the first side rails of the one of the pair of ladder sections and positioning the actuator member of the first lock actuator to engage the first side rail of the other of the pair of ladder sections and thereby move the first and second lock member engagement faces of the first side rails of the pair of ladder sections into locking engagement, and the clip of the second lock actuator supporting the actuator member of the second lock actuator and having a pair of arms engaging one of the second side rails of the one of the pair of ladder sections and positioning the actuator member of the second lock actuator to engage the second side rail of the other of the pair of ladder sections and thereby move the first and second lock member engagement faces of the second side rails of the pair of ladder sections into locking engagement.

26. A portable and collapsible user enclosure, comprising:

a platform configured to support a user thereon;

a frame assembly defining a user enclosure and positioned above the platform when the user is in the user enclosure;

a telescoping ladder attachable to the platform, the ladder having a longitudinal axis and a plurality of ladder sections telescopically connected together and movable along the ladder axis between an extended position and a collapsed position, each ladder section including first and second side rails and a rung extending therebetween, the first and second side rails of the one of the pair of ladder sections being retained adjacent to the respective first and second side rails of the other of the pair of ladder sections for movement along the ladder axis, the first and second side rails of the one of the pair of ladder sections having first lock members and the first and second side rails of the other of the pair of ladder sections having second lock members, the first and second lock members being positioned on the first and second side rails of the pair of ladder sections being positioned on the first and second side rails of the pair of ladder sections to be in position for the respective first and second lock members to lockably engage each other when the ladder is in the extended position; and first and second lock actuators for the adjacent pairs of ladder sections, the first lock actuator being positioned to engage and operable to move the first side rail of the one of the pair of ladder sections toward the first side rail of the other of the pair of ladder sections to bring the first and second lock members of the first side rails of the pair of ladder sections into locking engagement, and the second lock actuator being positioned to engage and operable to move the second side rail of the one of the pair of ladder sections toward the second side rail of the other of the pair of ladder sections to bring the first and second lock members of the second side rails of the pair of ladder sections into locking engagement.

27. The user enclosure of claim 26 wherein the first and second lock actuators each including an actuator member, the actuator member of the first lock actuator being operable to move the first and second lock members of the first side rails of the pair of ladder sections into locking engagement, and the actuator member of the second lock actuator being operable to move the first and second lock members of the second side rails of the pair of ladder sections into locking engagement.

28. The user enclosure of claim 27 wherein the actuator members of the first and second lock actuators including cams, with the cam of the actuator member of the first lock actuator positioned to engage and manually operable to move the first side rail of the one of the pair of ladder sections toward the first side rail of the other of the pair of ladder sections to bring the first and second lock members of the first side rails of the pair of ladder sections into locking engagement, and with the cam of the actuator member of the second lock actuator is positioned to engage and manually operable to move the second side rail of the one of the pair of ladder sections toward the second side rail of the other of the pair of ladder sections to bring the first and second lock members of the second side rails of the pair of ladder sections into locking engagement.

29. The user enclosure of claim 28 wherein the first and second lock actuators each further including a clip, the clip of the first lock actuator rotatably supporting the cam of the first lock actuator and having a pair of arms engaging one of the first side rails of the one of the pair of ladder sections and positioning the cam of the first lock actuator to engage the first side rail of the other of the pair of ladder sections and thereby move the first and second lock members of the first side rails of the pair of ladder sections into locking engagement, and the clip of the second lock actuator rotatably supporting the cam of the second lock actuator and having a pair of arms engaging one of the second side rails of the one of the pair of ladder sections and positioning the cam of the second lock actuator to engage the second side rail of the other of the pair of ladder sections and thereby move the first and second lock members of the second side rails of the pair of ladder sections into locking engagement.

30. A portable and collapsible user enclosure, comprising:

a platform configured to support a user thereon;

a frame assembly defining a user enclosure and positioned above the platform when the user is in the user enclosure;

a telescoping ladder attachable to the platform, the ladder having a longitudinal axis and a plurality of ladder sections telescopically connected together and movable along the ladder axis between an extended position and a collapsed position, each ladder section including first and second side rails and a rung extending therebetween, the first and second side rails of the one of the pair of ladder sections being retained adjacent to the respective first and second side rails of the other of the pair of ladder sections for movement along the ladder axis, the first and second side rails of the one of the pair of ladder sections having first lock members and the first and second side rails of the other of the pair of ladder sections having second lock members, the first and second lock members being positioned on the first and second side rails of the pair of ladder sections being positioned on the first and second side rails of the pair of ladder sections to be in position for the respective first and second lock members to lockably engage each other when the ladder is in the extended position; and first and second lock actuators for the adjacent pairs of ladder sections, the first lock actuator being positioned to move the first and second lock members of the first side rails of the pair of ladder sections into locking engagement, and the second lock actuator being positioned to move the first and second lock members of the second side rails of the pair of ladder sections into locking engagement, the first and second lock actuators each including a manually movable actuator member, the actuator member of the first lock actuator being manually operable to move the first and second lock members of the first side rails of the pair of ladder sections into locking engagement, and the actuator member of the second lock actuator being manually operable to move the first and second lock members of the second side rails of the pair of ladder sections into locking engagement, the actuator members of the first and second lock actuators including cams, with the cam of the actuator member of the first lock actuator positioned to engage and operable to move the first side rail of the one of the pair of ladder sections toward the first side rail of the other of the pair of ladder sections to move the first and second lock members of the first side rails of the pair of ladder sections into locking engagement, and with the cam of the actuator member of the second lock actuator is positioned to engage and operable to move the second side rail of the one of the pair of ladder sections toward the second side rail of the other of the pair of ladder sections to move the first and second lock members of the second side rails of the pair of ladder sections into locking engagement, the actuator member of the first lock actuator further including a manually rotatable lever coupled to the cam of the first lock actuator and rotatable between an unlocked position and a locked position, movement of the lever of the first lock actuator to the locked position moving the cam of the first lock actuator to move the first side rail of the one of the pair of ladder sections toward the first side rail of the other of the pair of ladder sections and thereby move the first and second lock members of the first side rails of the pair of ladder sections into locking engagement, and the actuator of the second lock actuator further including a manually rotatable lever coupled to the cam of the second lock actuator and rotatable between an unlocked position and a locked position, movement of the lever of the second lock actuator to the locked position moving the cam of the second lock actuator to move the second side rail of the one of the pair of ladder sections toward the second side rail of the other of the pair of ladder sections and thereby move the first and second lock members of the second side rails of the pair of ladder sections into locking engagement, the first and second lock actuators each further including a clip, the clip of the first lock actuator rotatably supporting the lever of the first lock actuator and having a pair of arms engaging one of the first side rails of the one of the pair of ladder sections and positioning the cam of the first lock actuator to engage the first side rail of the other of the pair of ladder sections and thereby move the first and second lock members of the first side rails of the pair of ladder sections into locking engagement, and the clip of the second lock actuator rotatably supporting the lever of the second lock actuator and having a pair of arms engaging one of the second side rails of the one of the pair of ladder sections and positioning the cam of the second lock actuator to engage the second side rail of the other of the pair of ladder sections and thereby move the first and second lock members of the second side rails of the pair of ladder sections into locking engagement.

* * * * *

UNITED STATES PATENT AND TRADEMARK OFFICE
CERTIFICATE OF CORRECTION

PATENT NO.   : 6,505,707 B1
DATED        : January 14, 2003
INVENTOR(S)  : David Lee Berry It is certified that error appears in the above-identified patent and that said Letters Patent is hereby corrected as shown below:

<u>Title page,</u>
Item [73], Assisgnee, shoud read as -- Hurricane Graphics, Inc. --

Signed and Sealed this

Twenty-seventh Day of May, 2003

JAMES E. ROGAN
*Director of the United States Patent and Trademark Office*